United States Patent [19]

Ishikawa et al.

[11] Patent Number: 4,894,666

[45] Date of Patent: Jan. 16, 1990

[54] IMAGE RECORDING METHOD AND APPARATUS

[75] Inventors: Noriyoshi Ishikawa, Yokohama; Toshiaki Harada, Kawasaki; Toshiharu Inui, Yokohama; Tadashi Yamamoto, Kawasaki; Kazuhiro Nakajima; Masanori Takenouchi, both of Yokohama, all of Japan

[73] Assignee: Canon Kabushiki Kaisha, Tokyo, Japan

[21] Appl. No.: 259,896

[22] Filed: Oct. 19, 1988

[30] Foreign Application Priority Data

Oct. 22, 1987 [JP] Japan ................................ 62-265423

Jun. 13, 1988 [JP] Japan ................................ 63-143683

[51] Int. Cl.[4] ................................ G01D 15/10

[52] U.S. Cl. ................................ 346/76 PH; 355/27

[58] Field of Search ................ 346/76 PH; 355/27, 28

[56] References Cited

U.S. PATENT DOCUMENTS

| | | | |
|---|---|---|---|
| 3,944,356 | 3/1976 | Hayne | 355/218 |
| 4,255,042 | 3/1981 | Armitage | 355/218 |
| 4,797,689 | 1/1989 | Nanai | 346/76 PH |
| 4,814,808 | 3/1989 | Sangioji et al. | 355/27 |

FOREIGN PATENT DOCUMENTS

| | | | |
|---|---|---|---|
| 0205083 | 12/1986 | European Pat. Off. . | |
| 0267165 | 11/1987 | Japan | 346/76 PH |
| 2113860 | 11/1985 | United Kingdom . | |

*Primary Examiner*—L. T. Hix

*Assistant Examiner*—Khanh Dang

*Attorney, Agent, or Firm*—Fitzpatrick, Cella, Harper & Scinto

[57] ABSTRACT

This specification discloses an image recording apparatus having conveying means for conveying a transfer recording medium having a transfer recording layer whose transfer characteristic is varied by first energy and second energy being imparted thereto, a recording unit having first energy imparting means for imparting the first energy to the transfer recording medium and second energy imparting means for imparting the second energy to the transfer recording medium provided along the conveyance route of the transfer recording medium conveyed by the conveying means, a transfer unit for transferring an image formed on the transfer recording medium in the recording unit to a recording medium, and applying means for applying predetermined heat energy and a shearing force to the recording medium to which the image has been transferred in the transfer unit. The specification also discloses an image recording method for recording an image on a recording medium, having the energy imparting step of imparting energy to a transfer recording medium having a transfer recording layer whose transfer characteristic is varied by the energy being imparted thereto to form an image on the transfer recording medium, the transferring step of transferring the image formed on the transfer recording medium by the energy imparting step to the recording medium, and the step of imparting a shearing to the recording medium to which the image has been transferred by the transferring step.

23 Claims, 20 Drawing Sheets

IMAGE RECORDING METHOD AND APPARATUS

BACKGROUND OF THE INVENTION

1. Field of the Invention

This invention relates to an image recording method and apparatus for recording an image on a recording medium. The term ¢image recording apparatus" covers a printer apparatus, a copying apparatus, an electronic typewriter, etc.

2. Related Background Art

In recent years, with the rapid advance of the information industry, various information processing systems have been developed and image recording apparatuses suited for the respective information processing systems have been developed.

One of the image recording apparatuses is a thermosensitive transfer recording apparatus. This apparatus effects recording on a recording sheet by the use of an ink ribbon comprising a ribbon-like back-up member having applied thereto heat-meltable ink having a colorant dispersed in a heat-meltable binder That is, the ink ribbon is superposed on the recording sheet so that the heat-meltable ink layer thereof contacts with the recording sheet, and the ink ribbon and the recording sheet are conveyed between a thermal head and a platen, and pulse-like beat conforming to an image signal is applied to the back-up member side of the ink ribbon by the thermal head and at the same time, the two are urged against each other to transfer the molten ink to the recording sheet, thereby recording on the recording sheet an ink image conforming to the application of the heat.

Such image recording apparatus has recently been used widely because of its compactness, light weight and noise-free operation as well as its capability of accomplishing recording on plain paper.

However, the conventional thermosensitive transfer recording apparatus is not free of problems.

The conventional thermosensitive transfer recording apparatus suffers from a problem that the transfer recording performance, namely, the quality of image, is greatly affected by the degree of smoothness of the surface of the recording sheet and good image recording can be accomplished on recording sheets of a high degree of smoothness, but the quality of images recorded is deteriorated in the case of recording sheets of a low degree of smoothness.

Also, in the conventional thermosensitive transfer recording apparatus, when a polychromatic image is to be obtained, it is necessary to repeat transfer and superpose colors one upon another. This leads to the necessity of providing a plurality of thermal heads or causing the recording sheet to effect complicated movement such as stoppage and reverse feeding, and this in turn leads to the problem that not only color misregistration is unavoidable, but also the entire apparatus becomes bulky and complex.

So, the applicant has invented an image recording method and a transfer recording medium which eliminate the above-noted problems peculiar to the conventional image recording apparatus and which can record an image of high quality even on a recording medium of a low degree of surface smoothness and which, when applied to polychromatic recording, can obtain a multi-colored (full-colored) image without causing the recording medium to effect complicated movement. The applicant claimed patents for these inventions by filing Japanese Application Pat. No. 60-120080 (filed on June 3, 1985), Japanese Application Pat. No. 60-120081 (filed on June 3, 1985), Japanese Application Pat. No. 60-131411 (filed on June 17, 1985), Japanese Application Pat. No. 60-134831 (filed on June 20, 1985), Japanese Application Pat. No. 60-150597 (filed on July 9, 1985), Japanese Application Pat. No. 60-199926 (filed on Sept. 10, 1985) and Japanese Application Pat. No. 60-250884 (filed on Nov. 11, 1985) in Japan. Further, claiming priority based on these Japanese patent applications, the applicant filed a U.S. application (Ser. No. 869,689, filed on June 2, 1986 in U.S.) and a European application (No. 86107540.6, filed on June 3, 1986 in Europe).

The present invention which will hereinafter be described a further development of the inventions covered by the aforementioned applicant's Japanese applications, U.S. application and European application. The present invention which will hereinafter be described permits the image recording method and apparatus and the transfer recording medium disclosed in the specifications of the aforementioned applications to be suitably applied thereto.

SUMMARY OF THE INVENTION

It is an object of the present invention to provide an image recording method and apparatus which can improve the coverage of an image formed on a recording medium.

It is another object of the present invention to provide an image recording method and apparatus which can form a clear-cut image on a recording medium.

It is still another object of the present invention to provide an image recording method and apparatus which can form an image of high quality on a recording medium.

It is yet still another object of the present invention to provide an image recording method and apparatus which can form an image of high quality even on a recording medium of a low degree of surface smoothness (for example, plain paper having a rough surface).

It is a further object of the present invention to provide an image recording method and apparatus which can promote mixing of the colors of image forming nuclides to thereby form an image of high quality It is still a further object of the present invention to provide an image recording method and apparatus which can accomplish the formation of an image on a transfer recording medium and the transfer of this image to a recording medium by discrete steps.

It is yet still a further object of the present invention to provide an image recording method and apparatus in which when predetermined pressure and/or heat is applied to a recording medium after image transfer, color mixing of the transfer recording layer from which the image is transferred is promoted.

BRIEF DESCRIPTION OF THE-DRAWINGS

Figure 4:
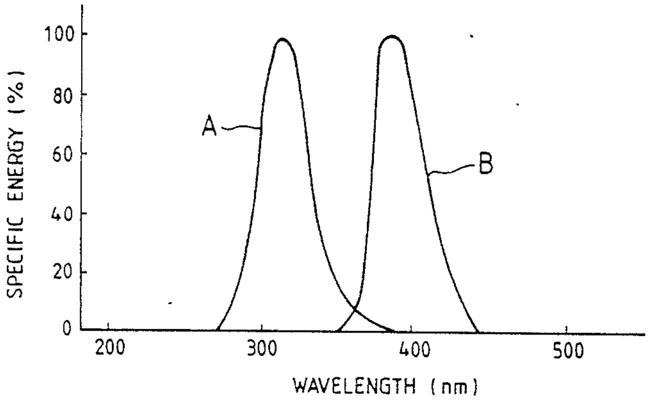

FIG. 4 a graph showing the spectral characteristic of light applying means.

Figure 5:
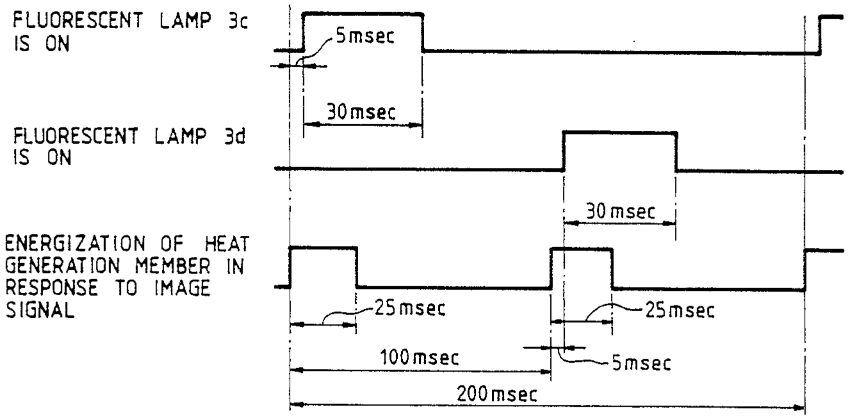

FIG. 5 is a timing chart for imparting heat and light.

Figure 6:
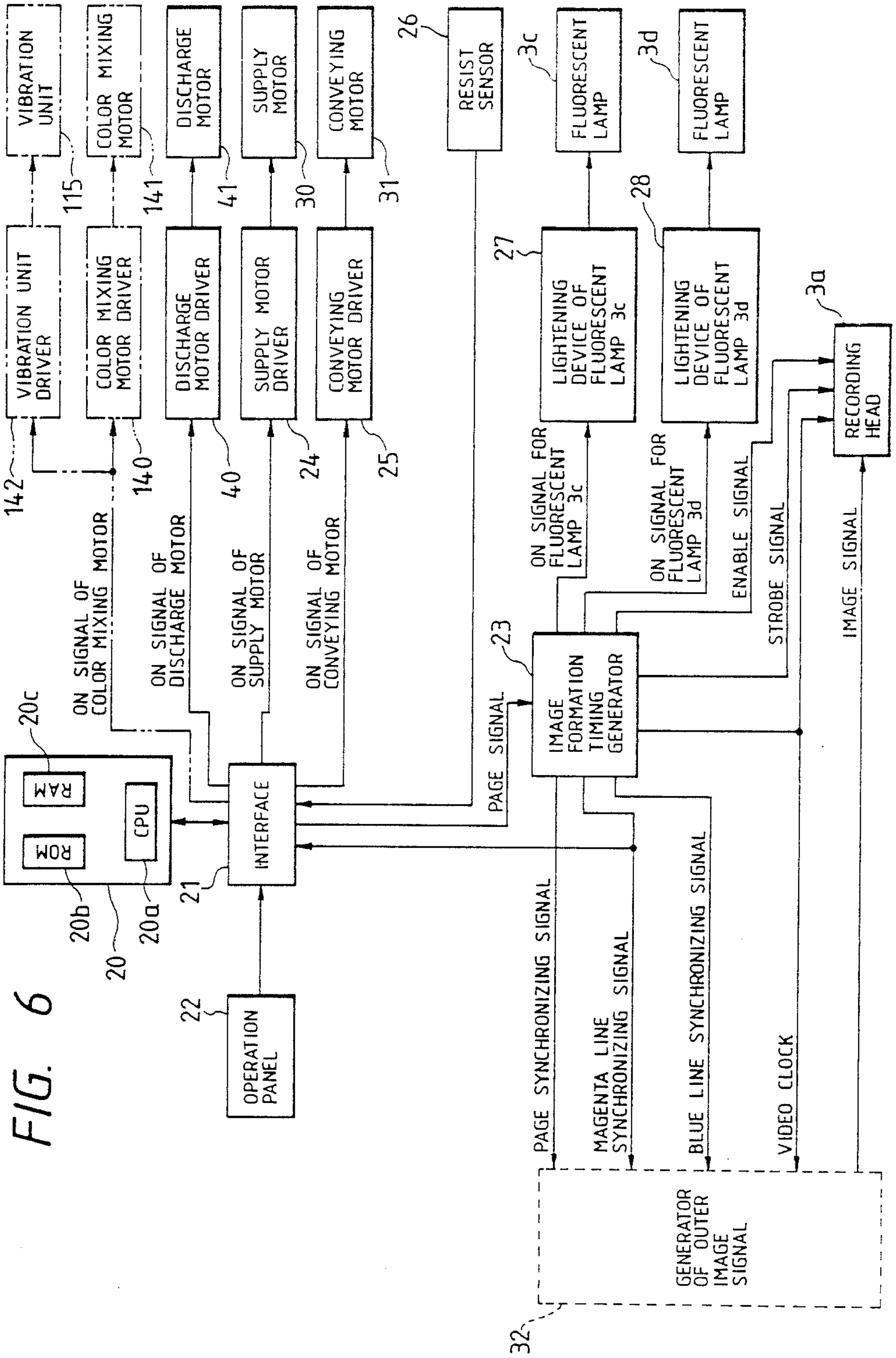

FIG. 6 is a block diagram of a control system.

Figure 7:
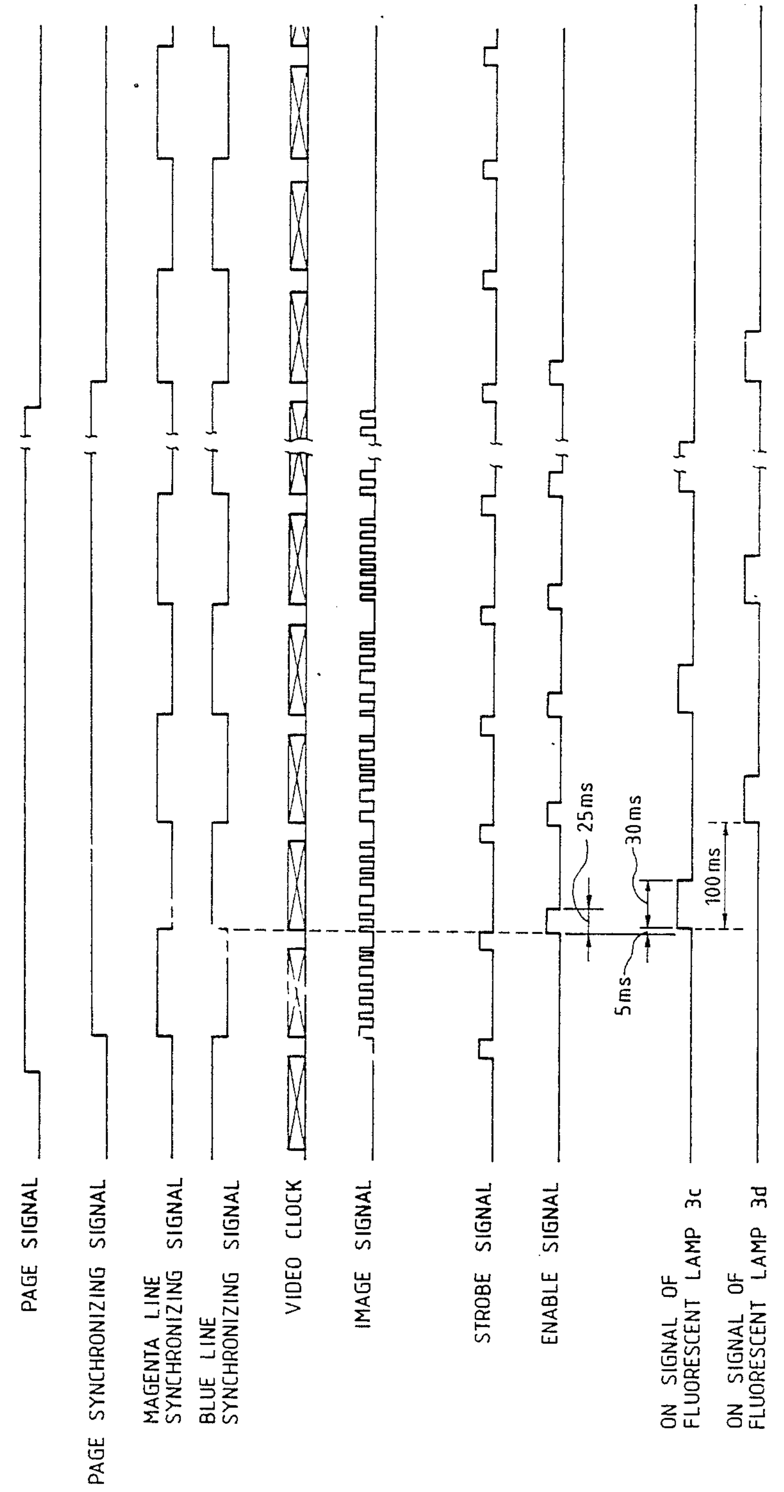
Figure 8:
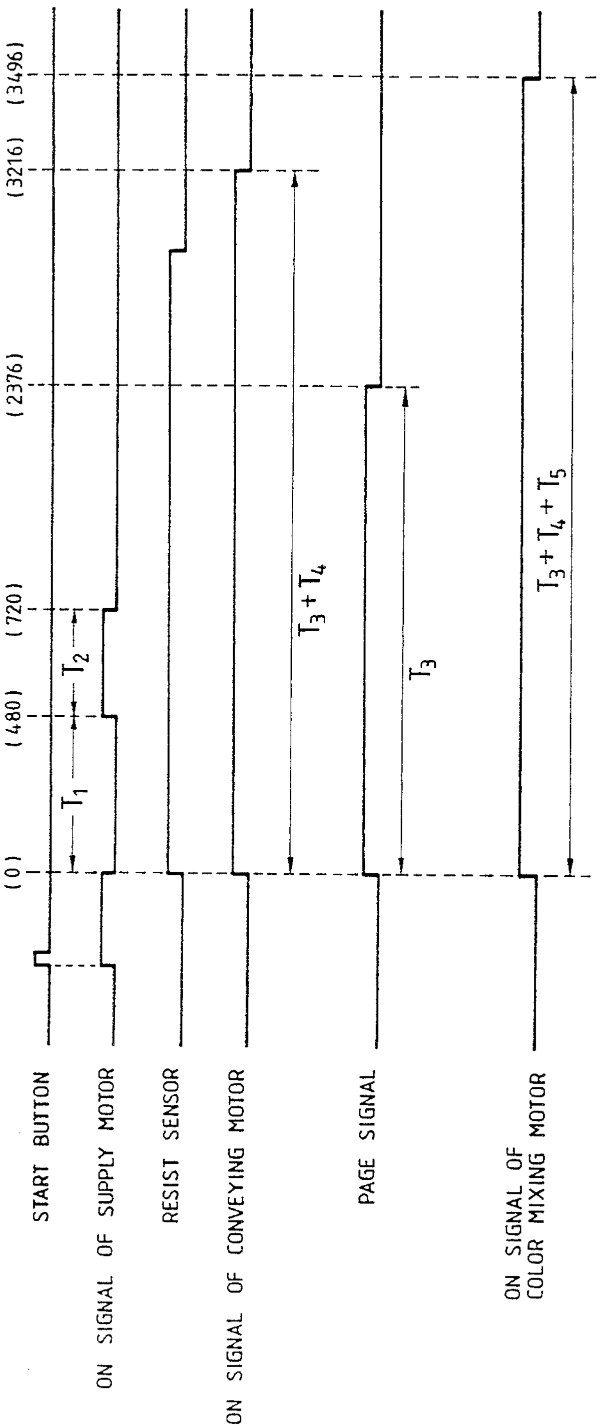

FIGS. 7 and 8 are timing charts of the recording operation.

Figure 9:
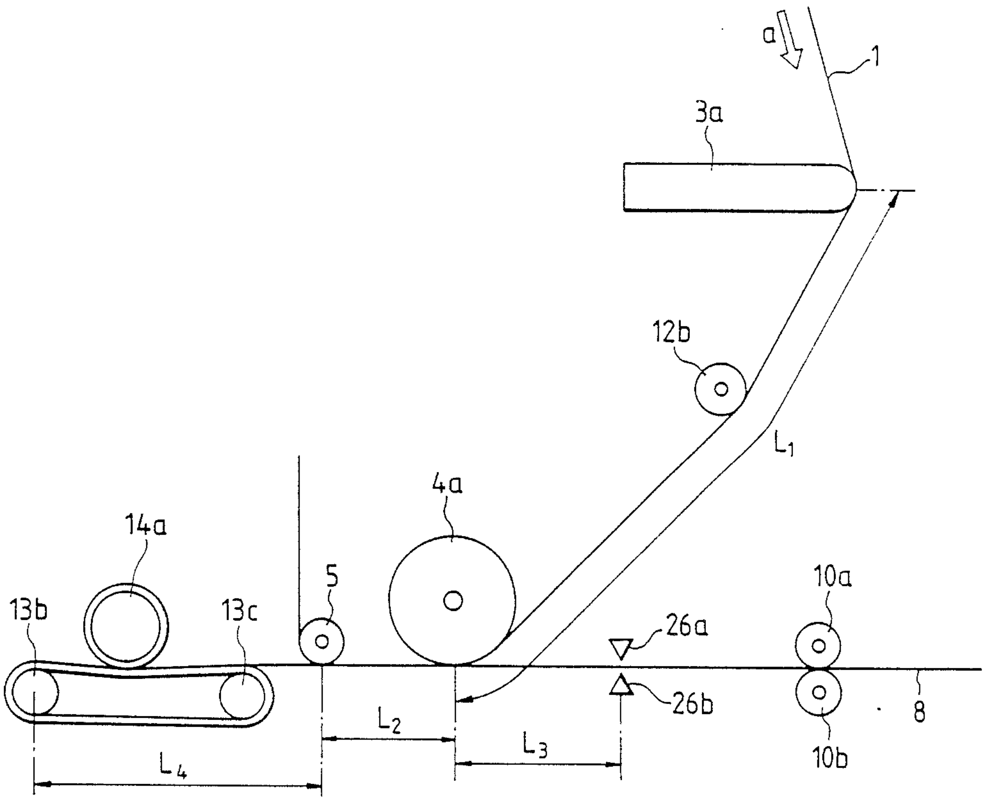

FIG. 9 illustrates the relations between various members.

Figure 10:
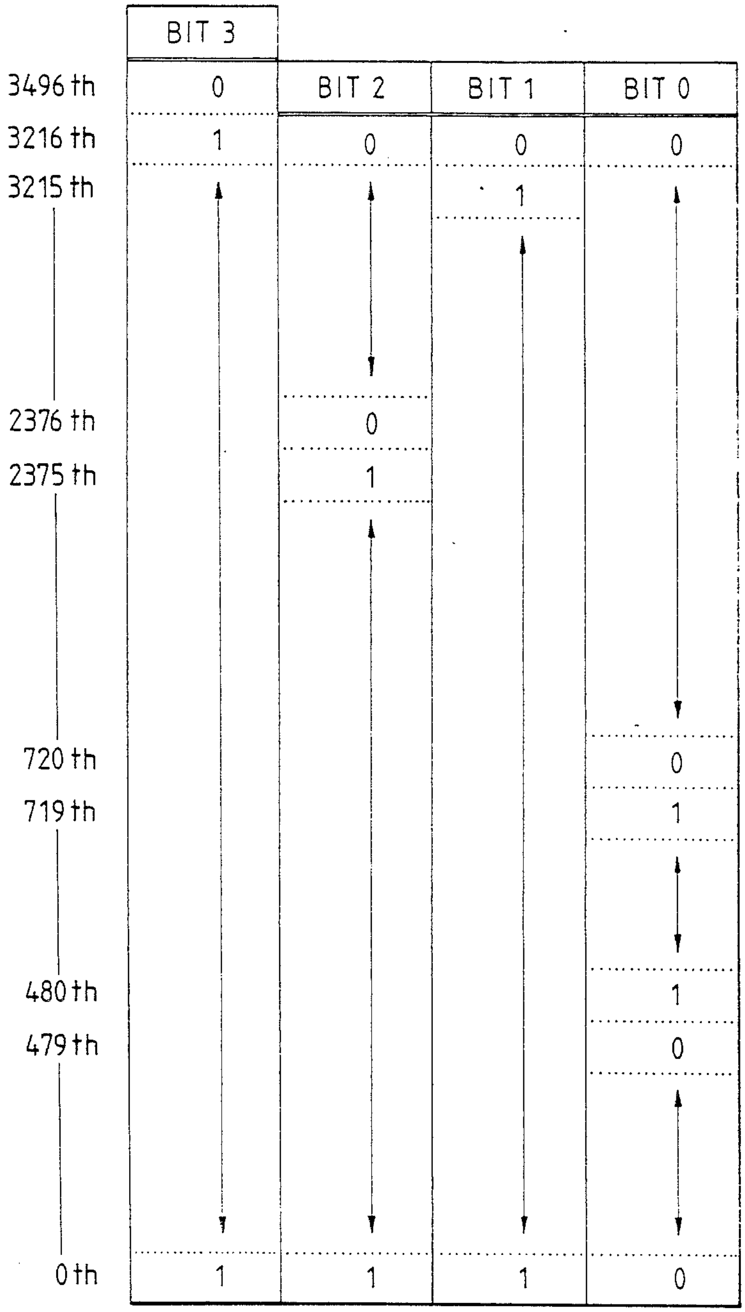

FIG. 10 illustrates a sequence table for effecting the various signals.

Figure 11:
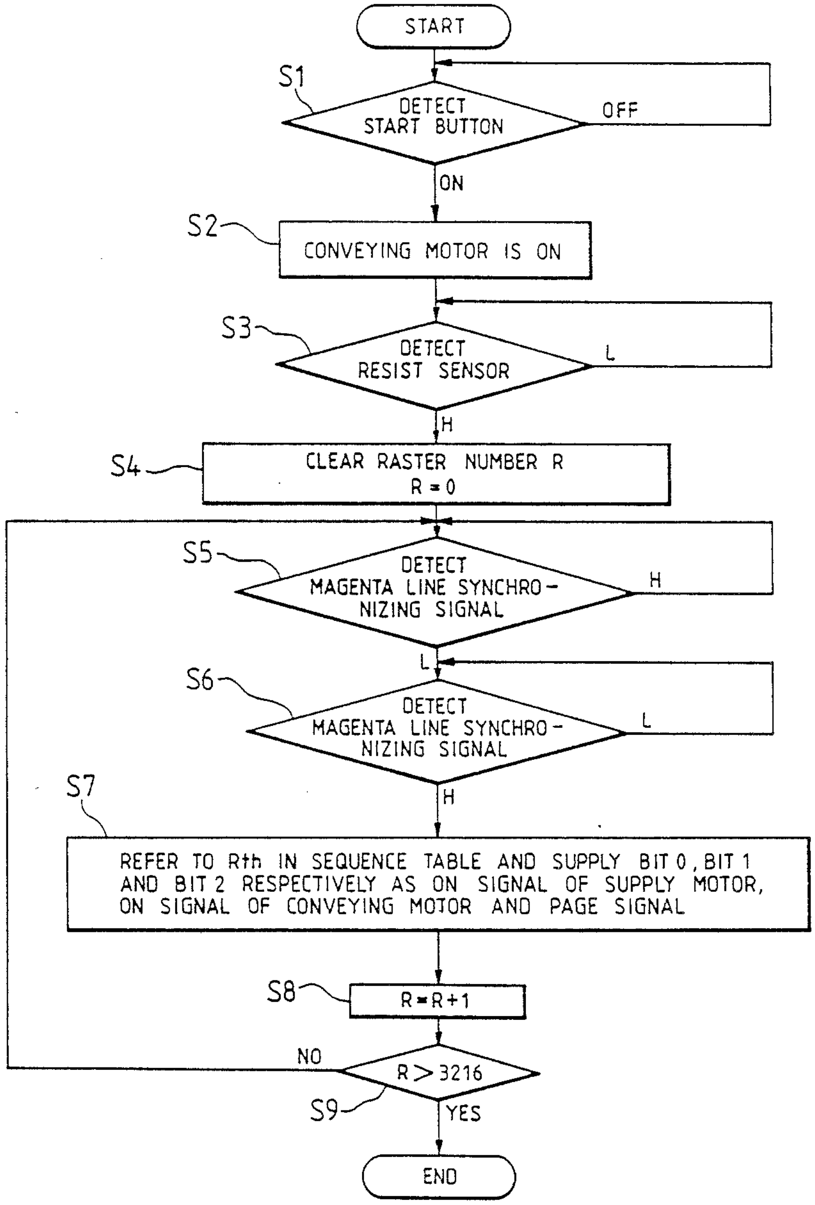

FIG. 11 is a flow chart of the recording operation.

Figure 12:
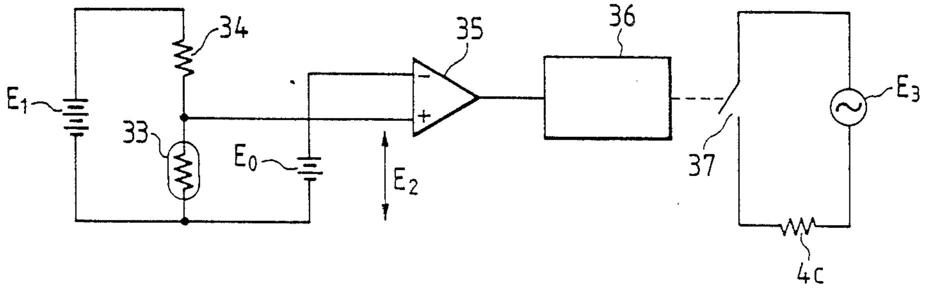

FIG. 12 illustrates a temperature control system for a transfer roller 4*a*.

Figure 13A:
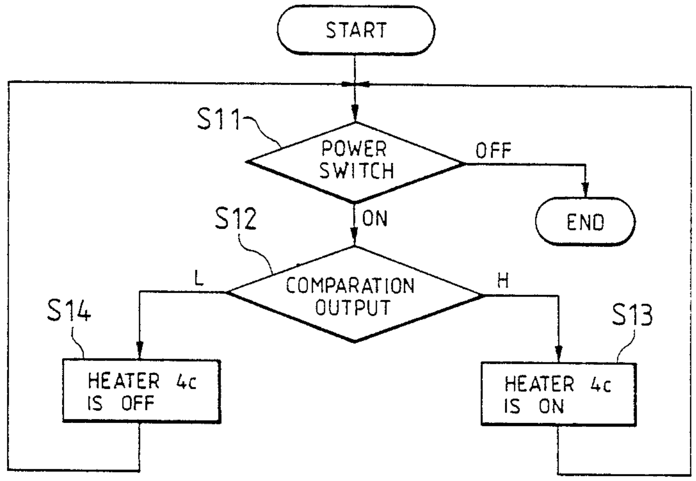
Figure 13B:
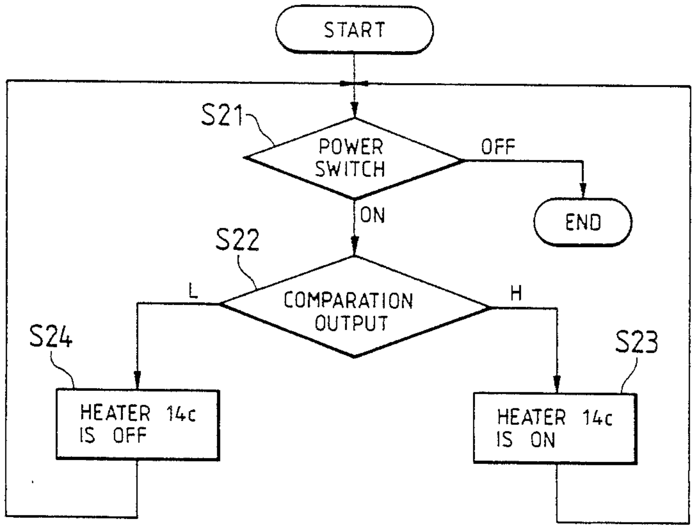

FIGS. 13A and 13B are flow charts of the temperature control operation.

Figure 14A:
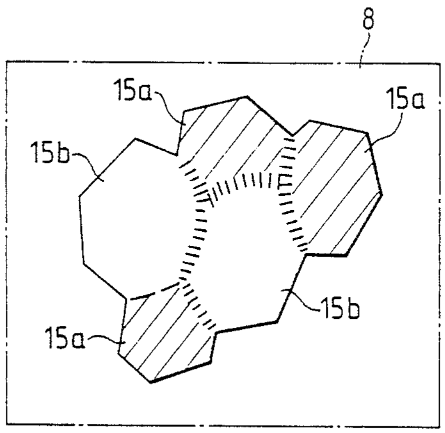
Figure 14B:
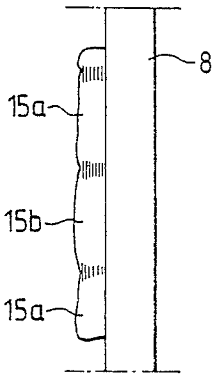

FIGS. 14A and 14B illustrates the state of an image before a recording sheet passes through applying means.

Figure 15A:
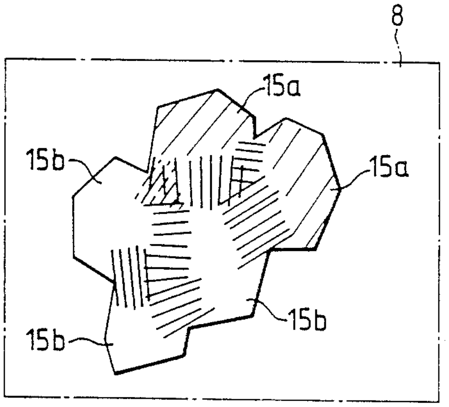
Figure 15B:
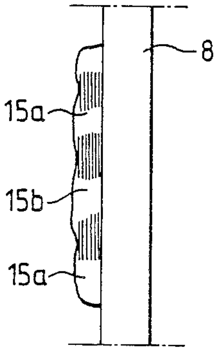

FIGS. 15A and 15B illustrates the state of the image after the sheet has passed through the applying means.

Figure 16A:
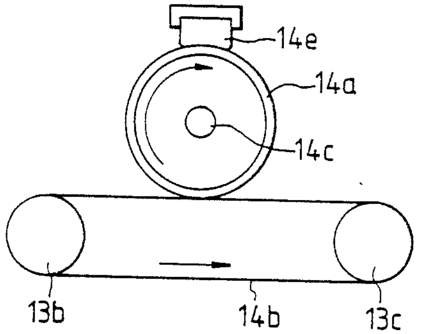
Figure 16B:
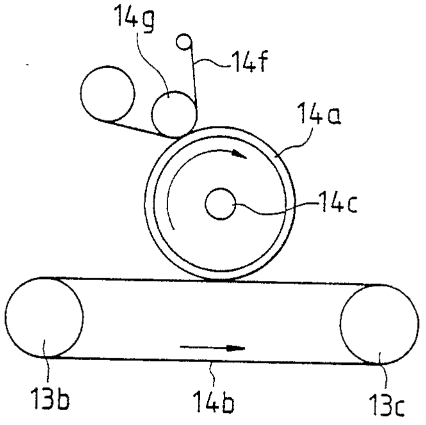

FIGS. 16A and 16B illustrate an embodiment in which the applying means is provided with a cleaning member.

Figure 17:
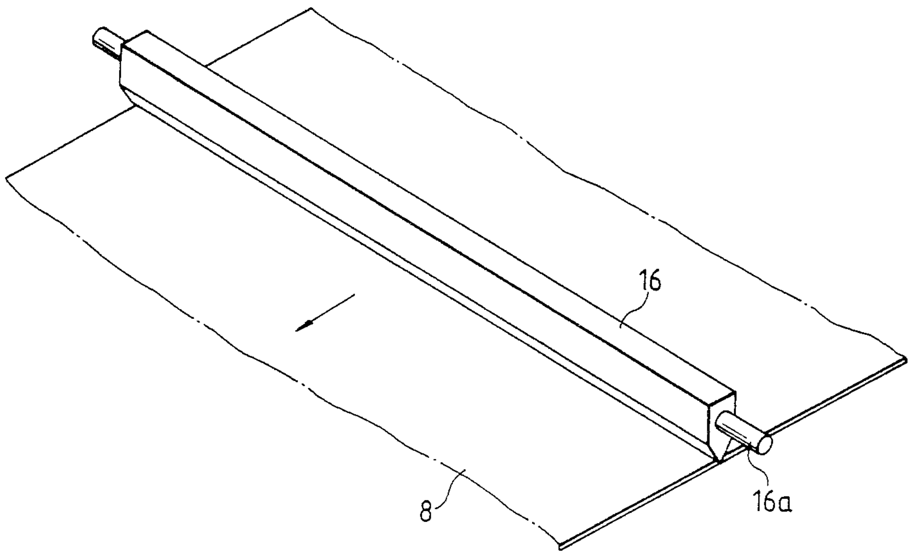

FIG. 17 illustrates an embodiment in which an unrotatable color mixing bar is provided.

Figure 18A:
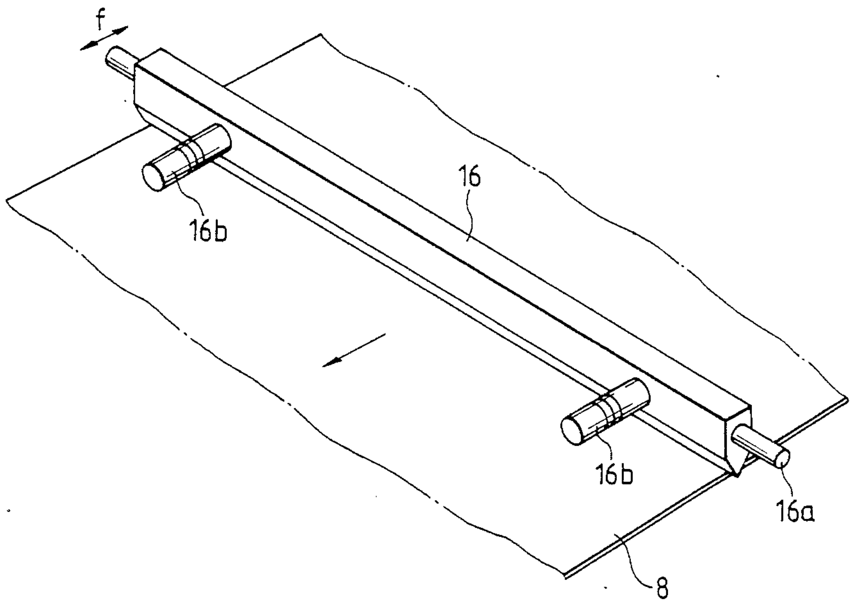
Figure 18B:
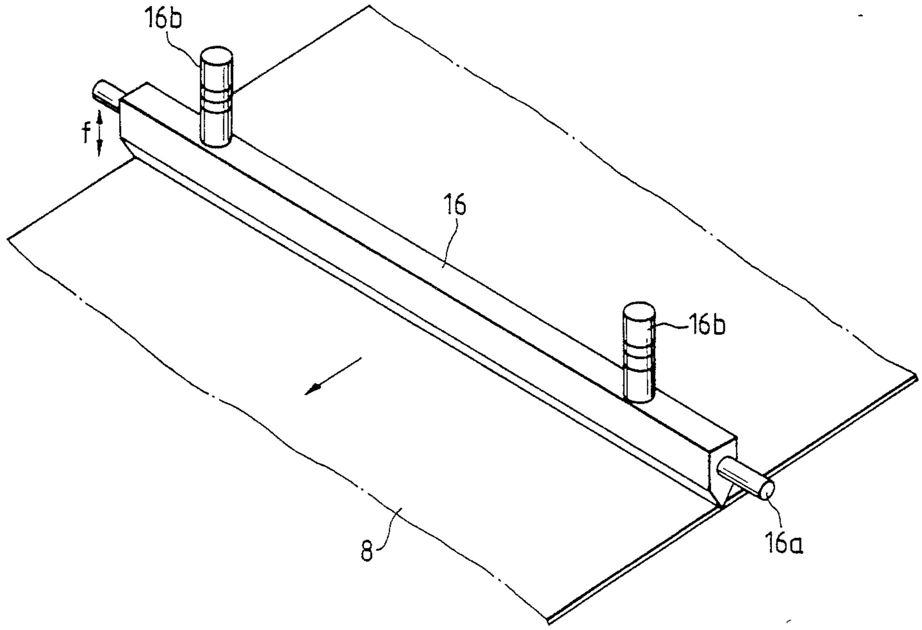

FIGS. 18A and 18B illustrates an embodiment for vibrating the color mixing bar.

Figure 19A:
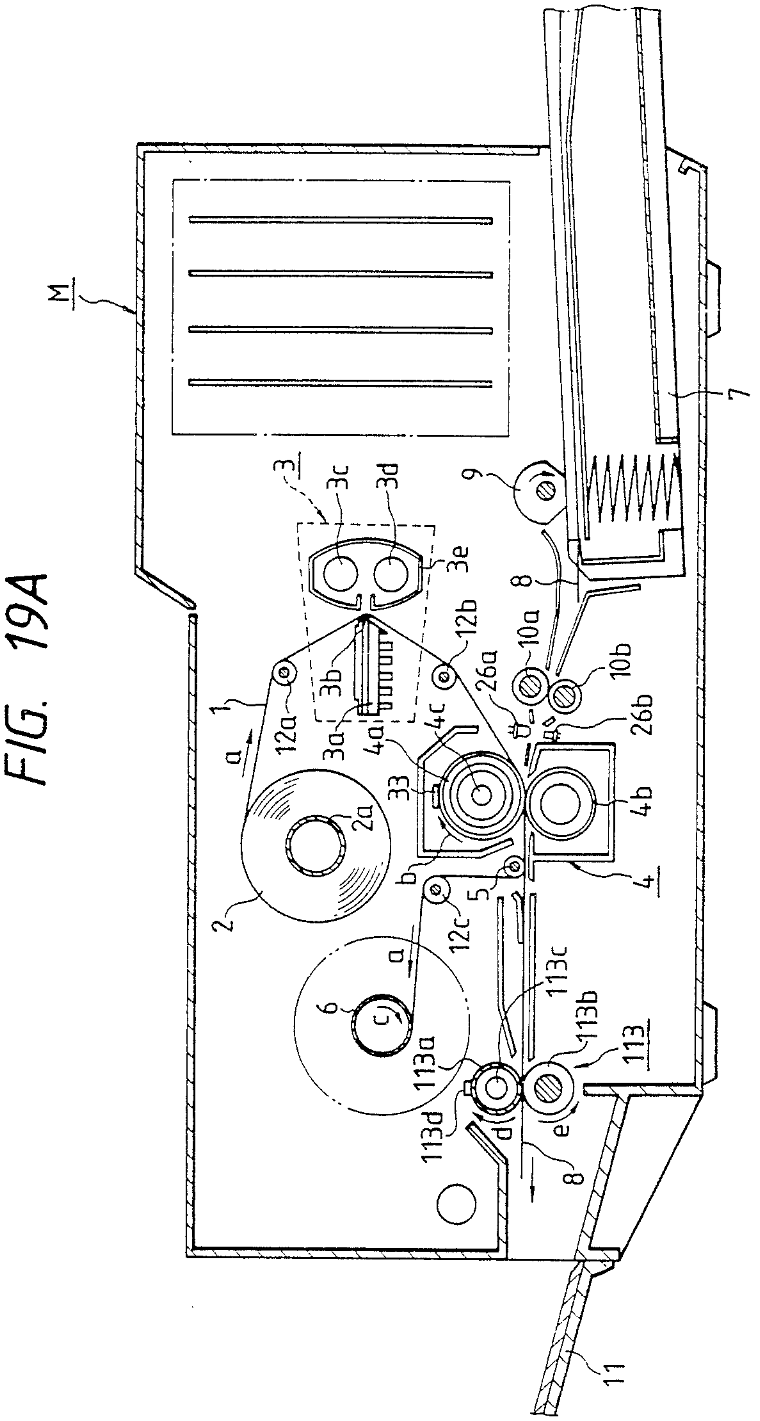
Figure 19B:
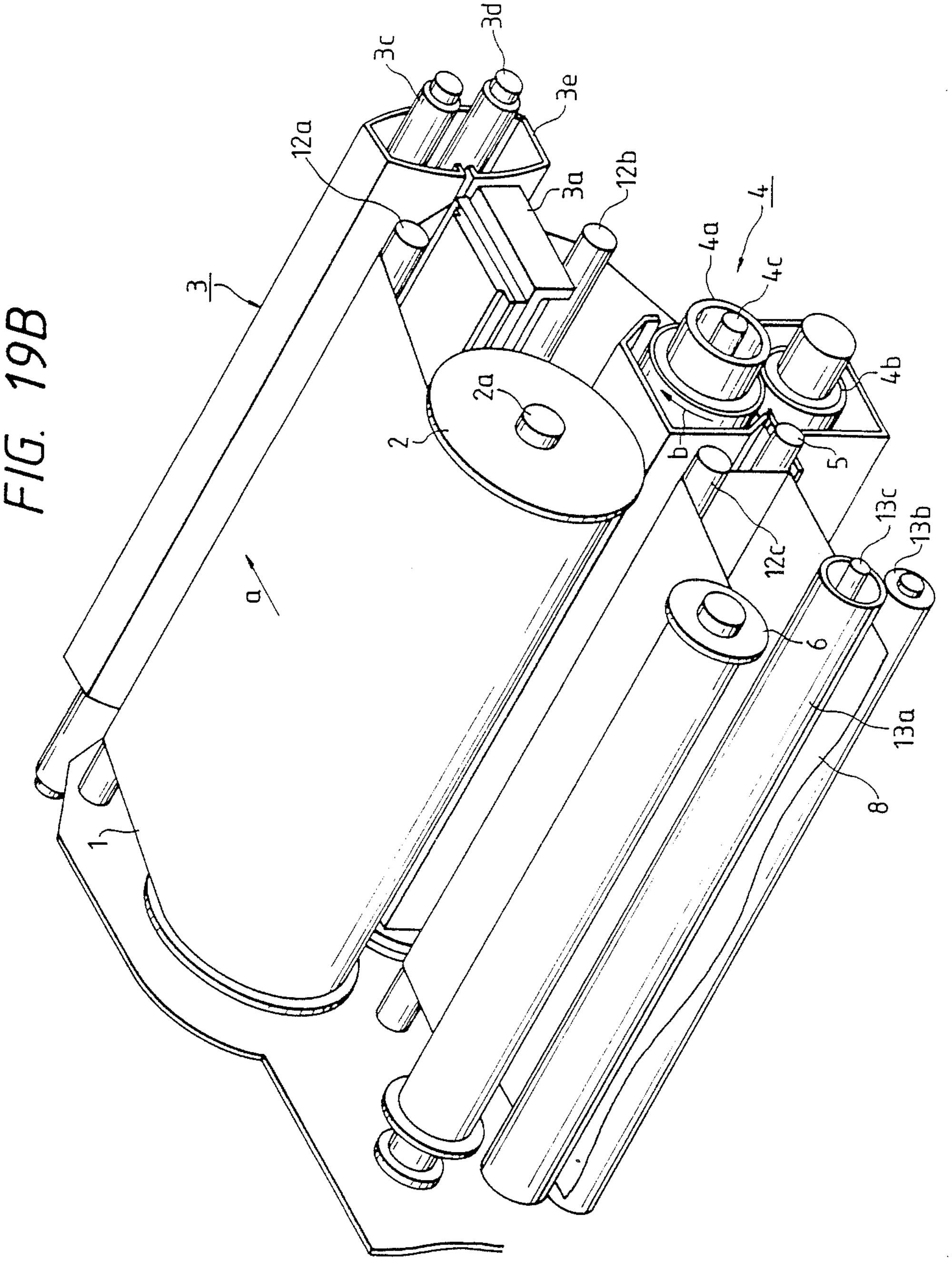
Figure 20:
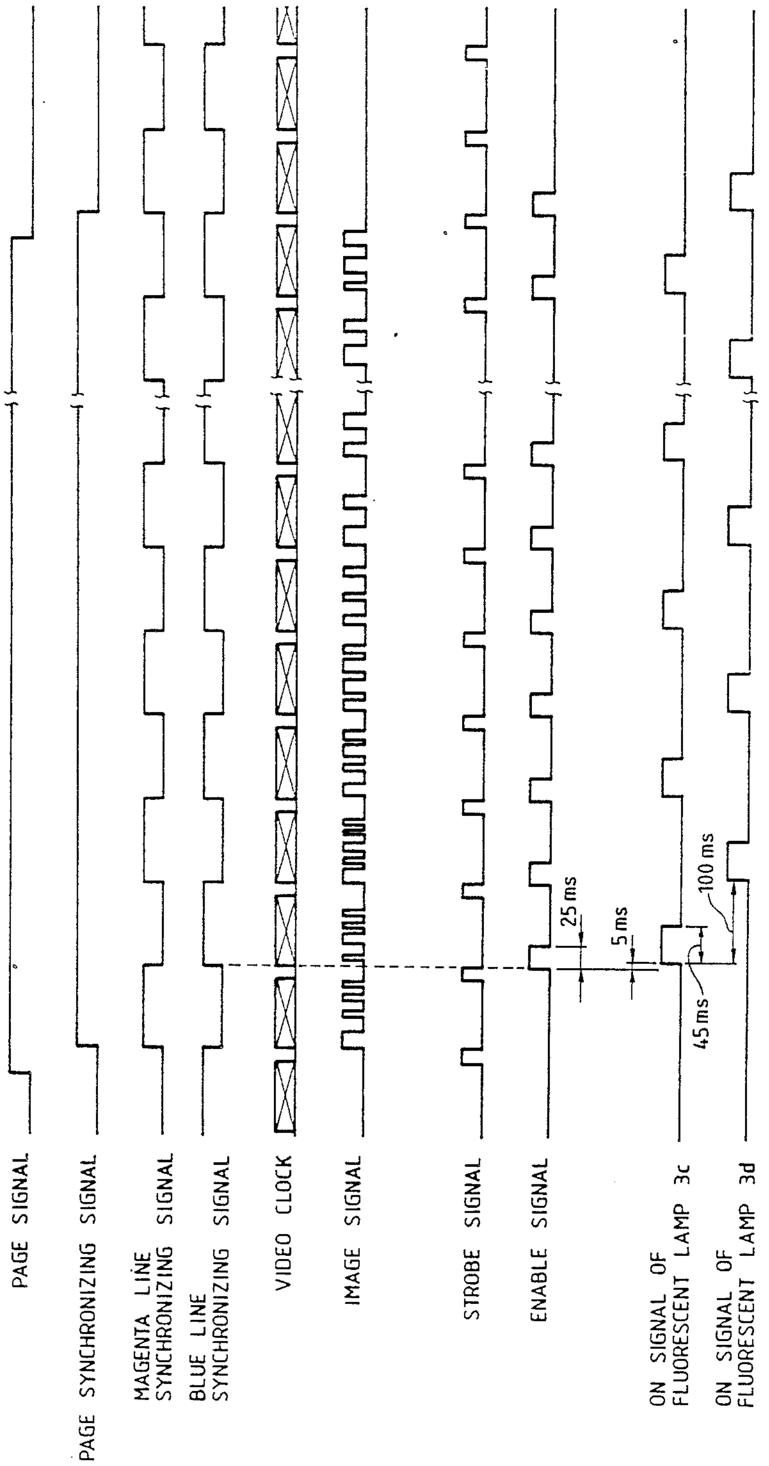
Figure 21:
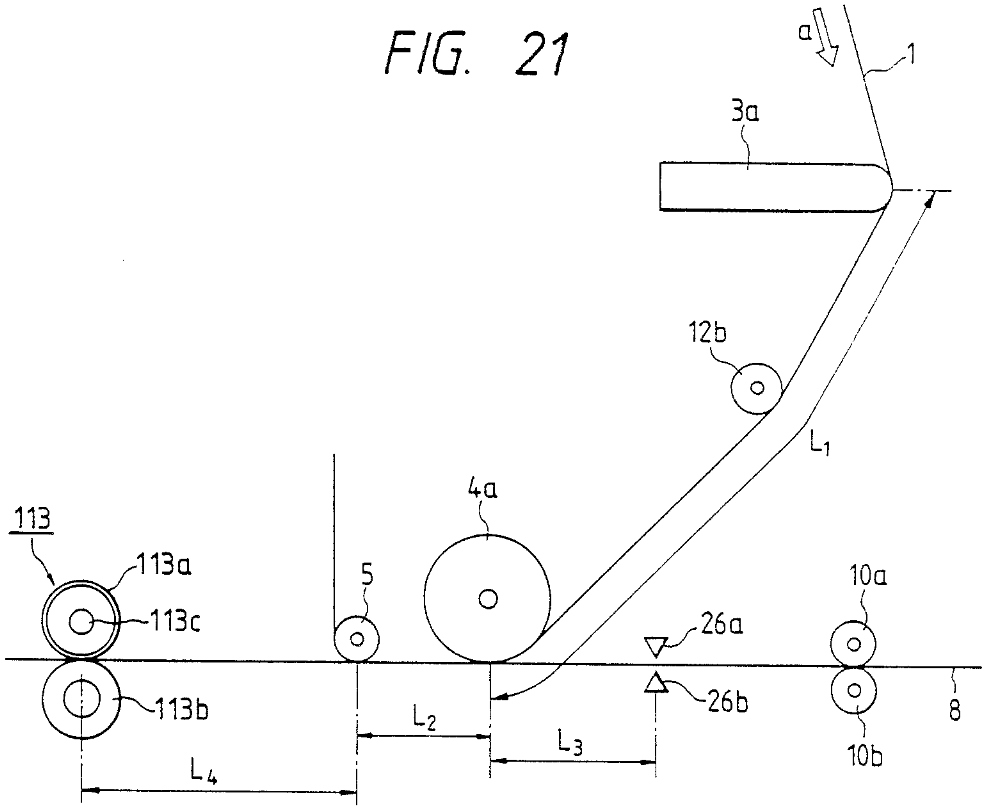
Figure 24:
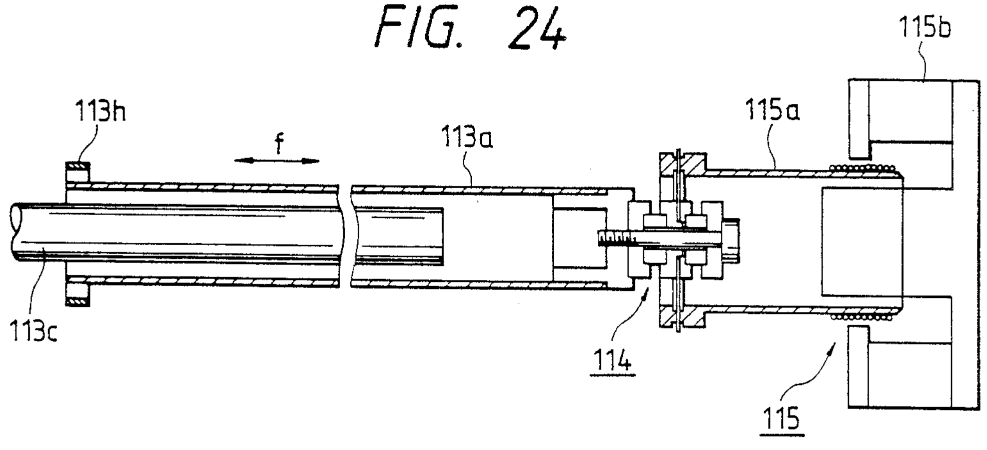
Figure 22:
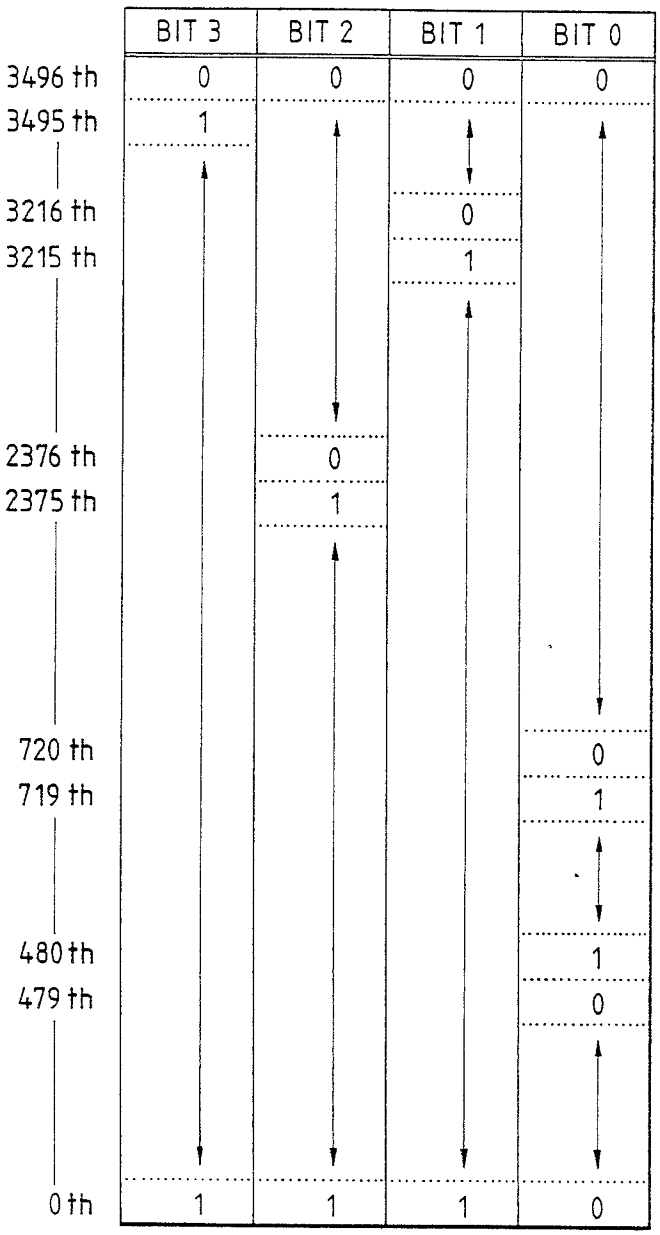
Figure 23:
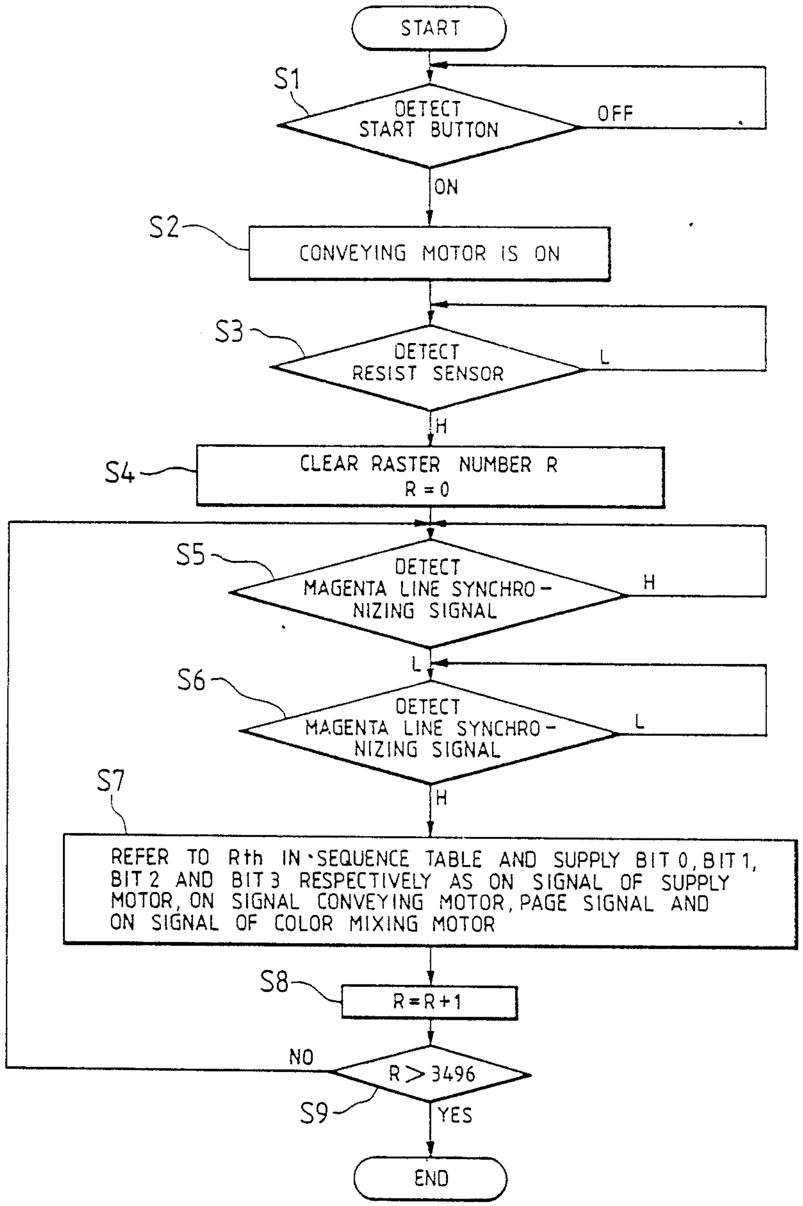
Figure 25:
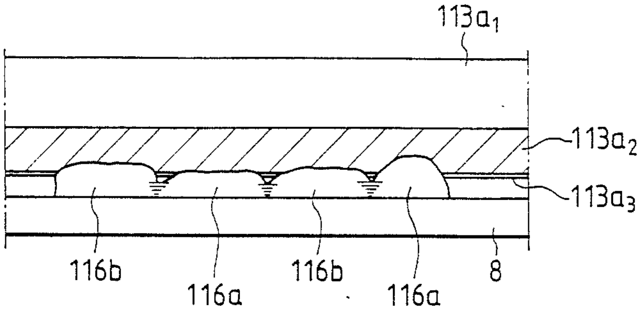
Figure 26A:
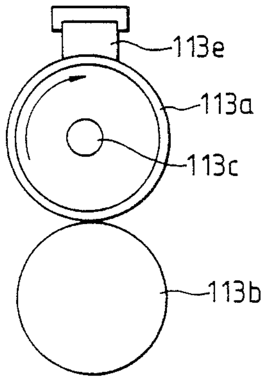
Figure 26B:
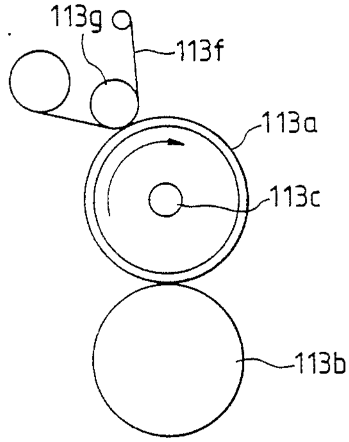
Figure 27:
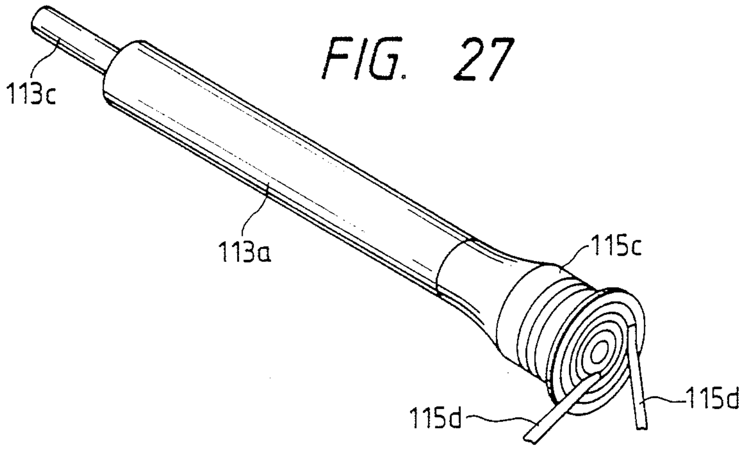

FIGS. 19 to 27 show another embodiment of the present invention,

FIGS. 19A and 19B being general schematic illustrations,

FIG. 20 being a timing chart of the recording operation,

FIG. 21 illustrating the relations between various members,

FIG. 22 illustrating a sequence table for effecting the supply of various signals, FIG. 23 being a flow chart of the recording operation, FIG. 24 illustrating a construction in which a vibration unit is attached to a color mixing roller, FIG. 25 illustrating the construction of a color mixing roller provided with an elastic material on the surface thereof and the action thereof, FIGS. 26A and 26B illustrating embodiments in which the color mixing roller is provided with a cleaning member, and FIG. 27 being a perspective view of an embodiment for vibrating the color mixing roller by a piezo-electric vibrator.

DESCRIPTION OF THE PREFERRED EMBODIMENTS

The image recording method and apparatus of the present invention will hereinafter be described with reference to the drawings.

The embodiments hereinafter described are image recording method and apparatus in which predetermined pressure and/or heat is applied to a recording medium after image transfer by the use of a contact member.

Description will now be made of a first embodiment to which the present invention is applied.

Figure 1A:
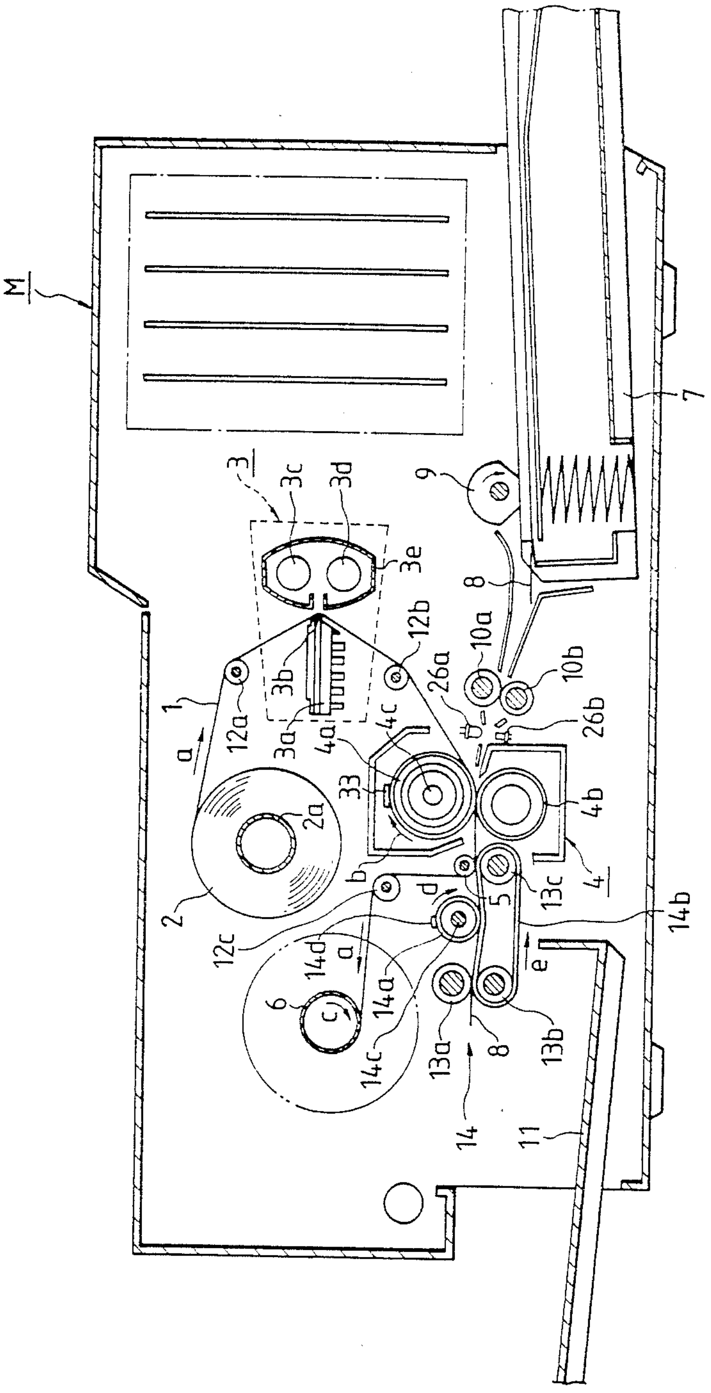
FIGS. 1A and 1B are schematic illustrations of an embodiment of the present invention.

FIG. 1A is a schematic cross-sectional view of a recording apparatus, and FIG. 2B is a perspective view of the recording apparatus.

In these figures, the reference numeral 1 designates a long sheet-like transfer recording medium wound in the form of a roll and removably incorporated as a supply roll 2 in the apparatus body M. That is, this supply roll 2 is removably loaded on a rotatable shaft 2*a* provided in the apparatus body M.

The leading end of the transfer recording medium 1 is brought from between a transfer roller 4*a* and a pressing roller 4*b* to a take-up roll 6 by a peeling-off roller 5 and a guide roller 12*c* via the supply roll 2, a guide roller 12*a*, a recording head 3*a* and a guide roller 12*b*, and is retained on the take-up roll 6 by means such as a gripper (not shown). Thereafter, the transfer roller 4*a* is rotated while a torque in the direction of arrow c is imparted to the take-up roll 6 by conventional driving means, whereby the transfer recording medium 1 is paid away in the direction of arrow a and is sequentially taken up onto the peripheral surface of the take-up roll 6.

During said take-up, predetermined back tension is imparted to the supply roll 2, for example, by a hysteresis brake (not shown), and the transfer recording medium 1 is designed to be conveyed by this tension and said guide rollers 12*a* and 12*b* while being urged against the recording head 3*a* with predetermined pressure and at a predetermined angle.

The constructions of said various portions will now be described in detail.

Figures 1B, 2:
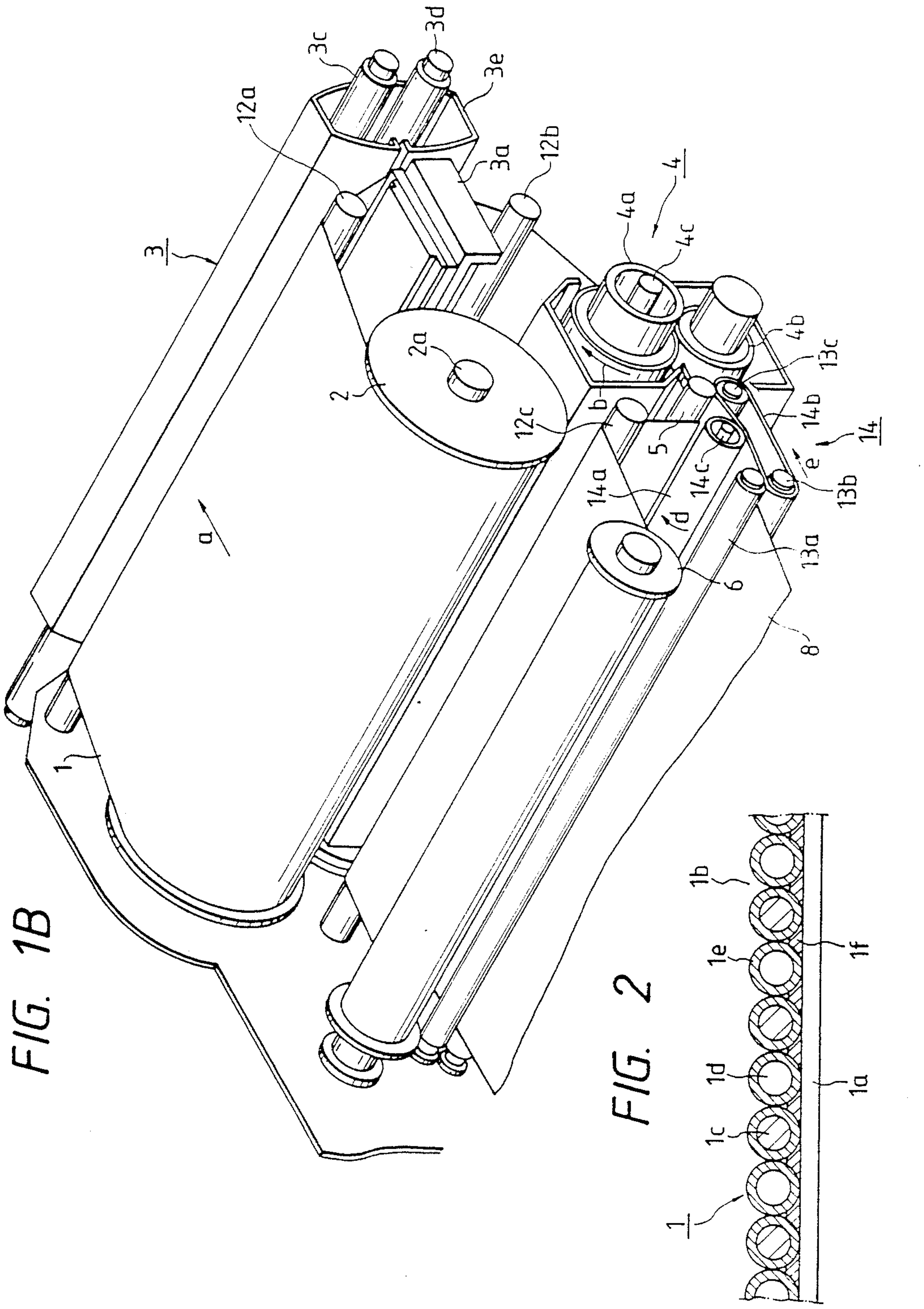
FIG. 2 illustrates the construction of a transfer recording medium.

First, the transfer recording medium 1, as shown in FIG. 2, comprises a sheet-like back-up member 1*a* and a transfer recording layer 1*b* attached thereto and having the property of being capable of forming an image thereon when heat energy and light energy are both imparted thereto.

Describing an example of it, as shown in FIG. 2, the transfer recording layer 1*b* comprises microcapsulelike image forming nuclides formed by a method shown below and by using components shown in Table 1 below as a core 1*c* and using components shown in Table 2 below as a core 1*d*.

TABLE 1

| Item | Component | wt. % |
|---|---|---|
| Polymeric monomer | 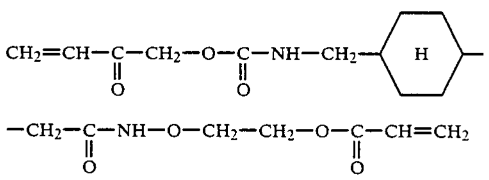 | 63 |
| Photopolymerization | 4,4-dimethoxybenzil/ ethyl-p-dimethylaminobenzoate | 5.1/ 0.4 |

TABLE 1-continued

| Item | Component | wt. % |
|---|---|---|
| starting agent | | |
| Binder | polymethyl methacrylate (Elvasite 2041 produced by Du Pont) | 22.5 |
| Colorant | PV Fast Pink E-01 (produced by Hekist, Inc.) | 9 |

TABLE 2

| Item | Component | wt. % |
|---|---|---|
| Polymeric monomer | 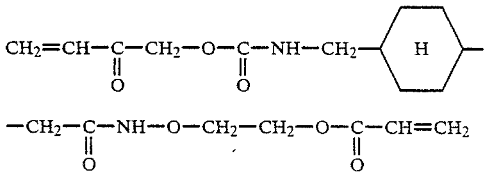 | 62 |
| Photopolymerization starting agent | 2-chlorothioxanthone/ ethyl-p-dimethylaminobenzoate | 4.8/ 1.2 |
| Binder | polymethyl methacrylate (Elvasite 2041 produced by Du Pont) | 22 |
| Colorant | Cyanin Blue 3472 (produced by Dainichi Seika, K. K.) | 10 |

That is, a mixture of 10 g of the components shown in Tables 1 and 2 and 20 parts by weight of methylene chloride is mixed with 200 ml of water in which an interface activator of an HLB value of at least 10 such as cation or nonyon and 1 g of gelatin are dissolved, and the mixture is stirred under a temperature of 60° C. at 8,000–10,000 rpm by a homomixer and emulsified to thereby obtain oil drops of an average particle diameter of 26 μm.

Further, the stirring is continued under a temperature of 60° C. for 30 minutes and methylene chloride is removed to thereby provide an average particle diameter of about 10 μm. 20 ml of water in which 1 g of Arabian rubber is dissolved is added thereto, and $NH_4OH$ (ammonia) water is added to the mixture while the mixture is cooled slowly, to provide pH11 or higher and thereby obtain microcapsule slurry, and 1.0 ml of water solution of 20% of glutaric aldehyde is slowly added thereto to thereby harden the capsule wall.

Thereafter, the solid and the liquid are separated from each other by a nutche filter, and the solid is dried at 35° C. for 10 hours by a vacuum drier to thereby obtain microcapsule-like image forming nuclides.

These image forming nuclides are microcapsules in which the cores 1*c* and 1*d* of Tables 1 and 2 are covered with a shell 1*e*, and are formed with a particle diameter of 7–15 μm and an average particle diameter of 10 μm.

The image forming nuclides thus formed are attached to the back-up member 1*a* by an attaching agent 1*f* to obtain the transfer recording medium 1. Describing this in more detail, the attaching agent 1*f* comprising toluene dissolved, for example, in a polyester adhesive agent Polyestar LP-022 (a solid content of 50%) produced by Nippon Gosei Kagaku Kogyo K.K., at ratio of 3 cc to 1 cc, is applied to the back-up member la comprising a polyethylene terephthalate film having a thickness of 6 μm. Thereafter, the solvent is dried and removed to provide a thickness of about 1 μm. This attaching agent 1*f* has a glass transition point of −15° C. and therefore keeps delicate tack left even at room temperature, and can cause the image forming nuclides formed as previously described to be readily attached to the back-up member 1*a*.

The microcapsule-like image forming nuclides having the components shown in Tables 1 and 2 as the core materials which were obtained as described above were then mixed at a ratio of 1:1 and sprinkled over the attaching agent, whereby the image forming nuclides were adhesively secured to the back-up member. Thereafter, when any excess image forming nuclides were shaken off, the image forming nuclides were found to be disposed on the attached layer substantially in one layer and at a rate of 90%.

Thereafter, pressure of about 1 kg/cm$^2$ and heat energy of about 80° C. are imparted to firmly fix the image forming nuclides to the back-up member 1*a*, thereby constructing the transfer recording medium 1.

Figure 3:
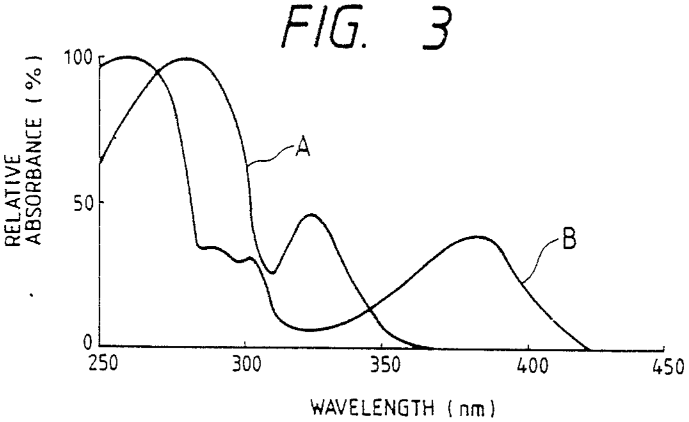
FIG. 3 is a graph showing the light absorbing characteristic of a photopolymerization starting agent in the transfer medium.

The photopolymerization starting agent in the image forming nuclides shown in Table 1 absorbs a light of the band of graph A in the light absorbing characteristic of FIG. 3 and starts reaction, and becomes magenta during image formation, and the photopolymerization starting agent in the image forming nuclides shown in Table 2 absorbs a light of the band shown in the graph B of FIG. 3 and starts reaction, and becomes blue during image formation.

The recording unit 3 will now be described. The recording unit 3 is comprised of heating means for imparting heat energy which is first energy to the transfer recording medium 1, and light applying means for imparting light energy which is second energy to the transfer recording medium 1.

The heating means comprises line type heat generating elements 3*b* for size A-4 having a width of 0.2 mm and 8 dots/mm and generating heat in response to an image signal, the heat generating elements 3*b* being arranged on the surface of the recording head 3*a*, and as previously described, the back-up member 1*a* side of the transfer recording medium 1 is adapted to be urged against the heat generating elements 3*b* with predetermined pressure by the back tension during conveyance. The image signal is produced, for example, from the control unit of a facsimile apparatus, an image scanner or an electronic blackboard in conformity with use.

On the other hand, at the transfer recording layer 1*b* side opposed to the recording head 3*a*, two fluorescent lamps 3*c* and 3*d* which are 20 W type light applying means having a spectral characteristic as shown in FIG. 4 are disposed at a distance of about 15-35 mm from the transfer recording medium 1.

Further, a slit plate 3*e* is provided at a distance of about 0.5 mm from the transfer recording medium 1 so as to provide an opening width of 1.2 mm so that the direct lights of the fluorescent lamps 3*c* and 3*d* are applied onto to that area of the transfer recording medium 1 urged against the recording head 3*a* which is immediately above the heat generating elements.

In the present embodiment, 20 W fluorescent lamp FL20SE for health ray produced by Toshiba K.K. is used as one fluorescent lamp 3*c* having the spectral characteristic shown in the graph A of FIG. 4, and 20 W fluorescent lamp FL10 A70E39 produced by Toshiba K.K. is used as the other fluorescent lamp 3*d* having the spectral characteristic shown in the graph B of FIG. 4.

The transfer unit 4 will now be described. The transfer unit 4 is comprised of a transfer roller 4*a* disposed downstream of the recording unit 3 with respect to the direction of conveyance of the transfer recording medium 1 and rotatively driven in the direction of arrow b as shown in FIG. 1, and a pressing roller 4*b* urged against the transfer roller 4*a*.

The transfer roller 4*a* is constructed of an aluminum roller having its surface covered with silicone rubber having a thickness of 1 mm and a hardness of 70 degrees, and is designed such that its surface is maintained at 90-100° C. by a halogen heater 4*c* of 800 W contained therein.

The pressing roller 4*b* comprises an aluminum roller covered with silicone rubber having a hardness of 70 degrees and a thickness of 1 mm, and its pressing force against the transfer roller 4*a* is set to 6-7 kgf/ cm by pressing means (not shown) such as a spring.

Further, recording sheets 8 which are recording mediums piled in a cassette 7 may be fed one by one by a feed roller 9 and a pair of register rollers 10*a* and 10*b*, and the leading end of the recording sheet 8 may be detected by a register sensor 26 comprising an LED 26*a* and a phototransistor 26*b* and the feed timing thereof may be controlled, whereby the recording sheet may be synchronously fed to the transfer unit 4 so as to overlap the image area of the transfer recording medium 1.

The recording sheet 8 having an image transferred thereto in the transfer unit 4 is discharged by a pair of discharge rollers 13*a* and 13*b*, and in the present embodiment, at this time, pressure and heat are applied by applying means 14 to the recording sheet 8 having an image transferred thereto. This applying means 14 is comprised of a color mixing roller 14*a* and a conveying belt 14*b* urged against the roller 14*a*.

The color mixing roller 14*a* is an aluminum roller having its surface finished as a mirror surface, and has a halogen heater 14*c* of 200 W provided therein, and the surface of the color mixing roller 14*a* is adapted to be maintained at 140°-150° C. by the heater 14*c*. The conveying belt 14*b* is formed of urethane rubber having a thickness of 1 mm, and this belt is passed over the rotatively driven discharge roller 13*b* and a follower roller 13*c*, and this conveying belt 14*b* is designed to be urged against the color mixing roller 14*a* with a pressure force of 0.05-0.1 kgf/cm.

The color mixing roller 14*a* and the conveying belt 14*b* are rotated in the directions of arrows d and e, respectively, by a discharge motor which will be described later. At this time, rotation control is effected by a drive transmitting system, not shown, connected to the discharge motor so that the rotational peripheral speed of the conveying belt 14*b* becomes the same as the conveyance speed of the recording sheet 8 by the transfer roller 4*a* and the rotational peripheral speed of the color mixing roller 14*a* becomes about 2% higher than the rotational peripheral speed of the conveying belt 14*b*.

Description will now be made of a recording method carried out by the use of the recording apparatus constructed as described above.

In this embodiment, an example is shown in which heat is imparted in conformity with an image signal and light is imparted uniformly.

When the motor is driven to pay away the transfer recording medium 1 sequentially from the supply roll 2 and light and heat are imparted to the transfer recording layer 1*b* of the transfer recording medium 1 in the recording unit 3 in conformity with an image signal, there is formed an image. The transfer recording layer 1*b* has the property that upon application of a light of a predetermined wavelength and heat thereto, the softening point temperature thereof rises, that is, the transfer characteristic thereof varies irreversibly and the image thereon is not transferred to the recording sheet 8. Accordingly, during magenta recording, electric power is not supplied to one of the heat generating elements 3*b* which corresponds to the magenta of the image signal and electric power is supplied to the portions which correspond to the white (the recording sheet 8 is white) and blue of the image signal for 25 mS, and the light of the fluorescent lamp 3*c* is uniformly applied thereto with a delay of 5 mS. The then application time is 30 mS, and is 45 mS in a second embodiment which will be described later.

During blue recording, electric power is not supplied to one of the heat generating elements 3*b* which corresponds to the blue of the image signal after the lapse of 50 mS after the termination of said application of light, that is, in 100 mS after the start of said supply of electric power, and electric power is supplied to the portions which correspond to the white and magenta of the image signal for 25 mS, and in 5 mS thereafter, the light of the fluorescent lamp 3*d* is uniformly applied thereto. The then application time is likewise 30 mS, and is 45 mS in the second embodiment which will be described later.

In the manner as described above, the recording head 3*a* is controlled in conformity with the blue, magenta and white image signals to thereby form a negative image on the transfer recording layer 1*b*, and the transfer recording medium 1 is synchronously conveyed at a repetition period of 200 mS/line.

A control system according to the present embodiment for effecting the above-described recording operation will now be described specifically with reference to FIGS. 6 to 12. FIG. 6 is a block diagram of the control system, FIGS. 7 and 8 are timing charts of the recording operation, FIG. 9 shows the relations between various members, FIG. 10 is a sequence table showing the sequence in which supply of various signals is effected, FIG. 11 is a flow chart of the recording operation, and FIG. 12 is a block diagram of a temperature control system for the transfer roller 4*a*.

This control system, as shown in FIG. 6, comprises a control unit 20 provided with a CPU 20*a* such as a microprocessor, ROM 20*b* storing therein the control program of the CPU 20*a* and various data, and RAM 20*c* used as the work area of the CPU 20*a* and effecting the temporary preservation of the various data, an interface 21, an operation panel 22, an image formation timing generator 23, a supply motor driver 24, a conveying motor driver 25, a discharge motor driver 40 [in the second embodiment which will be described later, a color mixing motor driver 140 and a vibration unit driver 142], a resist sensor 26 and fluorescent lamp turning-on devices 27 and 28.

The control unit 20 receives as inputs various types of information (such as the recording density, the number of records and the size of record), a signal from the resist sensor 26 and a magenta line synchronizing signal generated by the image formation timing generator 23, through the interface 21. Also, the control unit 20 generates the ON signal of a supply motor 30, the ON signal of a conveying motor 31, the ON signal of a discharge motor 41 and a page signal through the interface 21.

The image formation timing generator 23 frequency-divides the clock of a crystal oscillator therein and generates various signals (a magenta line synchronizing signal, a blue line synchronizing signal, a page synchronizing signal, a video clock, an enable signal, a strobe signal, fluorescent lamp ON signals, etc.).

The magenta line synchronizing signal and the blue line synchronizing signal, as shown in FIG. 7 (in the second embodiment which will be described later, FIG. 20), are signals having a period of 200 mS and a duty ratio of 50% and 180° out of phase with each other. The page signal delivered from the control unit 20 through the interface 21 is latched at the rising edge of the magenta line synchronizing signal to thereby make the page synchronizing signal.

The video clock is a signal which produces a clock of 25 KHz from the rising of the magenta and blue line synchronizing signals and produces 1728 (about 69 mS) clocks and thereafter ceases (the recording head 3*a* in the present embodiment has 1728 picture elements per line).

An extraneous image signal generator (such as a facsimile apparatus, an image scanner or an electronic blackboard) 32 receives the page synchronizing signal, the magenta and blue line synchronizing signals and the video clock from the image formation timing generator 23, and supplies 1728 magenta image signals in synchronism with the video clock when the magenta line synchronizing signal is "high" from the point of time at which the page synchronizing signal has become "high", and supplies 1728 blue image signals in synchronism with the video clock when the blue line synchronizing signal is "high".

Further, it produces a strobe signal which is "high" during the period during which said magenta and blue line synchronizing signals are "high" and the video clock ceases.

The enable signal repeats "high" for 25 mS from the rising edge of the magenta and blue line synchronizing signals, and terminates upon generation of "high" for 25 mS within the first "high" period of the magenta line synchronizing signal during which the page synchronizing fluorescent lamps 3*c* and 3*d* which are 20 W type light signal has become "low". This enable signal corresponds to the power supply signal to the heat generating elements 3*b* which corresponds to the image signal of FIG. 5.

Further, the image formation timing generator 23 generates fluorescent lamp ON signals. The ON signal of the fluorescent lamp 3*c* is a signal which becomes "high" with a delay of 5mS from the first rising of the enable signal and becomes "low" in 30 mS thereafter, and this is repetitively generated at every enable signal. Also, the ON signal of the fluorescent lamp 3*d* is likewise generated with a delay of 100 mS relative to the ON signal of the fluorescent lamp 3*c*.

The recording head 3*a* and the fluorescent lamps 3*c* and 3*d* are driven by said signals, and the recording head 3*a* introduces the image signal from the extraneous image signal generator 32 into a shift register in the head by the video clock from the image formation timing generator 23. The introduced image signal is latched into a latch register in the head by the strobe signal from the image formation timing generator 23, whereafter power supply to the heat generating elements 3*b* is effected by the enable signal from the image formation timing generator 23 in conformity with the image signal in the latch register, and simultaneously with this power supply, the next image signal is introduced into the shift register by the video clock.

The turning-on devices 27 and 28 for the fluorescent lamps 3*c* and 3*d* receive the ON signals of the fluorescent lamps 3*c* and 3*d* from the image formation timing generator 23, and turn on the corresponding fluorescent lamps 3*c* and 3*d* at a point of time whereat the ON signals of the respective fluorescent lamps 3*c* and 3*d* are "high".

By the above-described control, an image is formed on the transfer recording medium 1.

Description will now be made of the conveyance control of the transfer recording medium 1 and the recording sheet 8 for transferring the image formed on the transfer recording medium 1 to the recording sheet 8.

The supply motor driver 24 drives the supply motor 30 when the ON signal of the supply motor from the control unit 20 through the interface 21 is "high", and rotates the feed roller 9 and the pair of register rollers 10*a* and 10*b* to thereby convey the recording sheet 8 at a predetermined speed.

The conveying motor driver 25 drives the conveying motor 31 when the ON signal of the conveying motor from the control unit 20 through the interface 21 is "high", and rotates the transfer roller 4*a* and conveys the transfer recording medium 1 and the recording sheet 8 at a predetermined speed by the cooperation of the transfer roller 4*a* with the pressing roller 4*b* following the rotation thereof.

The discharge motor driver 40 likewise drives the discharge motor 41 when the ON signal of the discharge motor from the control unit 20 is "high", and rotates the discharge roller 13*b* and the color mixing roller 14*a* through the drive transmitting system. At this time, as previously described, by the drive transmitting system, the rotational peripheral speed of the color mixing roller 14*a* is set so as to be somewhat higher than the rotational peripheral speed of the conveying belt 14*b* rotated by the discharge roller 13*b*.

In the second embodiment which will hereinafter be described, the color mixing motor driver 141 likewise drives the color mixing motor 141 when the ON signal of the color mixing motor from the control unit 20 is "high", and rotates the color mixing motor 113*a* and the pressing roller 113*b* through the drive transmitting system. At this time, as previously described, by the drive transmitting system, the rotational peripheral speed of the rollers 113*a* and 113*b* is controlled so as to be the same as the conveyance speed of the recording sheet 8 by the transfer roller 4*a*.

The timing of each signal input and output by the control unit 20 through the interface 21 is as shown in FIG. 8. The times $T_1$14 $T_5$ in FIG. 8 are the times required for the transfer recording medium 1 or the recording sheet 8 to be conveyed as follows when the distances between various members are $L_1$–$L_4$ as shown in FIG. 9.

$L_1$: the distance of conveyance of the transfer recording medium 1 from the recording head 3*a* to the portion of pressure contact between the transfer roller 4*a* and the pressing roller 4*b*

$L_2$: the distance of conveyance of the transfer recording medium 1 from said portion of pressure contact to the peeling-off roller 5

$L_3$: the distance of conveyance of the recording sheet 8 from the resist sensor 26 to said portion of pressure contact $L_4$: the distance of conveyance of the recording sheet 8 from the peeling-off roller 5 to the discharge roller 13*b*[in the second embodiment which will be described later, the color mixing roller 113*a*, as shown in FIG. 21]

$T_1$: the time required for the transfer recording medium 1 to be conveyed by the distance $L_{1-L3}$ $T_2$: the time required for the recording sheet 8 to be conveyed by the distance $L_3$ $T_3$: the time required for the transfer recording medium 1 to be conveyed by an amount corresponding to the length of the recording sheet 8 (297 mm if the recording sheet is, for example, of size A4)

$T_4$: the time required for the transfer recording medium 1 to be conveyed by the distance $L_1+L_2$ $T_5$: the time required for the recording sheet 8 to be conveyed by the distance $L_4$ That is, when the operator depresses the start button on the operation panel 22, the supply motor 30 is driven to feed the recording sheet 8, and the driving of the supply motor is ceased at a point of time whereat the leading end of the recording sheet comes to the resist sensor 26. Simultaneously with this cease of the driving, the conveying motor 31 is driven to convey the transfer recording medium 1 in the direction of arrow a in FIG. 1 and the page signal is "high" for the time $T_3$, and the transfer image forming process is carried out in the recording unit 3.

The conveying motor 31 is stopped after the time $T_4$ has further elapsed after the lapse of the image formation time $T_3$.

The supply motor 30 is driven for the time $T_2$ after the lapse of the time $T_1$ after the conveyance of the transfer recording medium 1 is started, and conveys the recording sheet 8 at the same speed as the transfer recording medium 1 and is stopped. Thereby, the leading end of the recording sheet 8 coincides with the leading end of the transfer image formed on the transfer recording medium 1 in the transfer unit 4, and the recording sheet 8 is conveyed by the drive of the conveying motor 31 while keeping intimate contact with the transfer recording medium 1.

Here, the operation of the control unit 20 for delivering the signals as shown in FIG. 8 will be described. The control unit 20 receives as an input the magenta line synchronizing signal through the interface 21, and counts it by a software counter. That is, the magenta line synchronizing signal is of a period of 200 mS as previously described, and therefore, the control unit 20 can control time by counting said signal.

The control unit 20 has therein the sequence table as shown in FIG. 10 [in the second embodiment which will be described later, FIG. 22], and refers to the sequence table while counting the magenta line synchronizing signal after the signal of the resist sensor becomes "high", and delivers the ON signal of the supply motor, the ON signal of the conveying motor and the page signal [in the second embodiment which will be described later, the ON signal of the color mixing motor], and controls the driving of the various members by the respective signals.

In the present embodiment, the sequence table is of a 4-bit construction as shown in FIG. 10 [in the second embodiment which will be described later, FIG. 22]and comprises total 3217 words [in the second embodiment which will be described later, total 3497 wds]from the 0th to the 3216th [in the second embodiment which will be described later, the 3496th], and bit 0 corresponds to the ON signal of the supply motor, bit 1 corresponds to the ON signal of the conveying motor, bit 2 corresponds to the page signal, and bit 3 corresponds to the ON signal of the discharge motor [in the second embodiment which will be described later, the ON signal of the color mixing motor].

In FIG. 8, the numbers in parentheses at the top show the numbers of the magenta line synchronizing signals (the number of signals) at the respective points of time with the magenta line synchronizing signal at the point of time whereat the signal of the resist sensor has become "high" as the 0th.

The recording operation of the control unit 20 having the aforedescribed function will now be described with reference to the flow chart of FIG. 11.

First, whether the start button on the operation panel has been depressed is detected (S1), and if it has been depressed, the ON signal of the supply motor is supplied (S2). Subsequently, the signal of the resist sensor becoming "high" is waited for (S3), and 0 is substituted into R indicative of the raster number of the sequence table (S4). Then, the magenta line synchronizing signal becoming "low"is waited for (S5), for (S6). Thereby the rising edge of the magenta line synchronizing signal is detected. When said edge is detected, reference is made to the Rth in the sequence table, and bit 0 to bit 2 [in the second embodiment which will be described later, bit 3]are respectively supplied as the ON signal of the supply motor, the 0N signal of the conveying motor and the page signal [in the second embodiment which will be described later, the ON signal of the color mixing motor]. (S7). Subsequently, 1 is added to the value of said R (S8), and whether the value of said R is greater than 3216 [in the second embodiment which will be described later, 3496]is determined (S9), and if the value of said R is smaller than or equal to said 3216[in the second embodiment which will be described later, 3496], return is made to step S5, where recording is continued, and if the value of said R is greater, recording is terminated.

The image formed in the recording unit 3 in the manner described previously is heated and transferred to the recording sheet 8 in the transfer unit 4, and the temperature control of the transfer roller is designed as shown in FIG. 12.

The thermistor 33 of FIG. 12 is disposed so as to be in contact with the surface of the transfer roller 4a, and the resistance value thereof varies in conformity with the surface temperature of the transfer roller 4a, and this resistance value is converted into a voltage $E_2$ by a power source $E_1$ and a resistor 34, and the voltage $E_2$ is compared with a reference voltage $E_0$ by a comparator 35. The comparison output controls the power supply from a power source $E_3$ to a halogen heater 4c by a relay 37 through a relay driver 36.

The principle of the driving of the aforedescribed temperature control construction will be described here. The thermistor 33 has the property that the resistance value thereof becomes smaller if the temperature thereof rises, and consequently, if the surface temperature of the transfer roller 4a rises, the resistance value of the thermistor 33 falls and the voltage $E_2$ drops. Conversely, if the surface temperature of the transfer roller 4a falls, the resistance value of the thermistor 33 rises and the voltage $E_2$ also rises.

Accordingly, as shown in the flow chart of FIG. 13A, by setting the value of the reference voltage $E_0$ to the value of the voltage $E_2$ corresponding to 95° C. of the transfer roller 4a, if the surface temperature of the transfer roller 4a is lower than 95° C. when the power switch is ON (Sll), the comparison output becomes "high" and the halogen heater 4c becomes electrically energized (S12, S13), and the surface temperature of the transfer roller 4a rises. Conversely, if the temperature of the transfer roller 4a is higher than 95° C., the comparison output becomes "low" and the halogen heater 4c is not electrically energized (S12, S14), and the surface temperature of the transfer roller 4a falls. The surface temperature of the transfer roller 4a is maintained at 90°-100° C. by said control. This control system is constantly operating when the power switch of the apparatus is ON, and effects control so that the surface temperature of the transfer roller 4a becomes 90-100° C. before the start button on the operation panel is depressed.

An image is formed on the transfer recording medium 1 in the manner described above, and this image is transferred as magenta and blue images to the recording sheet 8 in the transfer unit 4.

Thereafter, the recording sheet 8 is peeled off from the transfer recording medium 1 by the peeling-off roller 5, and the transfer recording medium 1 is taken up onto the take-up roll 6 and the recording sheet 8 on which an image of a desired color has been recorded is conveyed to the applying means 14 by the driving of the discharge motor 41 which is operated by the 0N signal of the discharge motor.

Here in the present embodiment, the recording sheet 8 is conveyed by the color mixing roller 14a beated in the applying means 14 and the conveying belt 14b. At this time, there is a difference in speed between the color mixing roller 14a and the conveying belt 14b and therefore, heat energy and a shearing force are imparted to the image forming nuclides transferred to the recording sheet 8. The destruction of the capsule-like image forming nuclides is expedited by this energy, and color mixing is expedited at the boundary between the image forming nuclides.

The color mixing condition will hereinafter be described specifically with reference to the drawings. As shown in FIGS. 14A and 14B, the bluish purple image transferred to the recording sheet 8 in the transfer unit 4 is formed by blue image forming nuclides 15a and magenta image forming nuclides 15b being transferred. When this image passes through the applying means 14, as shown in FIGS. 15A and 15B, the destruction of the image forming nuclides 15a and 15b progresses by said heat energy and pressure and further, the shearing force being imparted and thus, coverage is improved, and the color mixing at the boundary between the image forming nuclides 15a and 15b progresses, whereby the bluish purple image becomes more clear-cut and the quality of the image is more improved.

The temperature control circuit for controlling the surface temperature of the color mixing roller 14a so as to be 140-150° C. is similar to the temperature control circuit for the transfer roller 4a shown in FIG. 12, and it is such that the surface temperature of the color mixing roller 14a is detected by a thermistor 14d provided on the surface of the color mixing roller 4a as shown in FIG. 1A, and the heater 14c is operated correspondingly to the comparison output of the control circuit when the power switch of the apparatus is ON, as shown in the flow chart of FIG. 13B, whereby the surface temperature of the color mixing roller 14a is maintained at 140°-150° C. (S21-S24).

The construction of the applying means 14 is not limited to a construction in which both of heat and pressure are applied to the recording medium, but may be a construction in which, for example, either of heat or pressure is applied to the recording medium.

The recording sheet 8 on which recording of three colors, i.e., blue, magenta and bluish purple, has been effected in one shot in the manner previously described is discharged onto the discharge tray 11 by the pair of discharge rollers 13a and 13b.

The second embodiment will hereinafter be described with reference to FIGS. 19 to 27. In the second embodiment, members identical to those in the above-described embodiment are given identical reference characters and need not be described.

The embodiment which will hereinafter be described is provided with heat and pressure applying means rotated in contact with a recording medium which has passed through the transfer unit for applying heat and pressure to the recording medium. This heat and pressure applying means is designed so as to be finely vibrated in a direction perpendicular to the direction of conveyance of the recording medium.

Now, in the embodiment which will hereinafter be described, as shown in FIGS. 19A and 19B, the heat and pressure applying means 113 is disposed downstream of the transfer unit (with respect to the direction of conveyance of the recording sheet 8).

The recording sheet 8 to which an image has been transferred in the transfer unit 4 is discharged via the heat and pressure applying means 113, and at this time, heat and pressure are applied to the recording sheet 8 by the heat and pressure applying means 113.

This heat and pressure applying means 113 is disposed downstream of the transfer unit 4 with respect to the direction of conveyance of the recording sheet 8, and is comprised of a color mixing roller 113a and a pressing roller 113b urged against the roller 113a.

The color mixing roller 113a is a roller comprising an aluminum roller having the surface thereof coated with Teflon (registered trademark) to a thickness of about 25 μm, and has a sheath heater 113c of 300 W provided therein, and the surface of the color mixing roller 113a is adapted to be maintained at about 150° C.–160° C. by the heater 113c.

The pressing roller 113b comprises a roller of silicone rubber having a thickness of 3 mm, and is designed to be urged against the color mixing roller 113a with a pressure force of 0.1 - 0.3 kgf/cm by a spring or the like, not shown.

Further, the color mixing roller 113a and the pressing roller 113b are rotable in the directions of arrows d and e, respectively, by a color mixing motor which will be described later. At this time, by a drive transmitting system, not shown, which is connected to the color mixing motor, the rotational peripheral speed of the two rollers 113a and 113b is controlled so as to be the same as the conveyance speed of the recording sheet 8 by the transfer roller 4a.

Further, as shown in FIG. 24, the color mixing roller 113a is rotatably mounted through a bearing unit 114, and a vibration unit 115 which provides vibration means comprising a voice coil 115a and a magnetic circuit 115b is mounted through the bearing unit 114. When the vibration unit 115 is driven, the color mixing roller 113a is adapted to vibrate finely at a frequency of 100 Hz and with an amplitude of about 0.3 mm in a direction perpendicular to the direction of conveyance of the recording sheet 8 (the direction of arrow f). In FIG. 24, the reference character 113h designates a color mixing roller driving gear connected to the drive transmitting system of the color mixing motor.

The heat and pressure applying means 113 is not limited to a construction in which both of heat and pressure are applied to the recording medium, but may be of a construction in which only one of heat and pressure is suitably applied to the recording medium as required.

An image recording method carried out by the use of the recording apparatus constructed as described above will now be described with reference to FIGS. 20 to 23. FIG. 20 is a timing chart of the recording operation, FIG. 21 shows the relations between various members, FIG. 22 illustrates a sequence table in which supply of various signals is effected, and FIG. 23 is a flow chart of the recording operation. Here, the description of the previous embodiment will be invoked for procedures similar to those in the aforedescribed first embodiment. Also, as to the differences in description, brackets ([]) have been used in the description of the image recording method of the previous embodiment. Also, with regard to the block diagram of the control system, dots-and-dash lines have been used in FIG. 6. Accordingly, in the second embodiment, the block diagram is such that a color mixing motor driver 140, a color mixing motor 141, a vibration unit driver 142 and a vibration unit 115 are added in place of the discharge motor driver 40 and the discharge motor 41.

Now, the image formed on the transfer recording medium 1 by the recording method as described previously is transferred as magenta and blue images to the recording sheet 8 in the transfer unit 4.

Thereafter, the recording sheet 8 is peeled off from the transfer recording medium 1 by the peeling-off roller 5, and the transfer recording medium 1 is taken up onto the take-up roll 6, and the recording sheet 8 to which images of desired colors have been transferred is conveyed to between the color mixing roller 113a and the pressing roller 113b which constitute the heat and pressure applying means 113.

In this heat and pressure applying means 113, the color mixing roller 113a is heated to 150°–160° C. by a heater 113c and is being vibrated at a frequency of 200 Hz and with an amplitude of about 0.1 mm in a direction perpendicular to the direction of conveyance of the recording sheet 8 by the driving of the voice coil 115a. Therefore, heat and pressure are applied to the recording sheet 8 when it passes between the rollers 113a and 113b, and a shearing force is imparted to the image forming nuclides transferred to the recording sheet 8, by the vibration of the color mixing roller 113a urged against the image-transferred surface. By this energy, the destruction of the capsule-like image forming nuclides is expedited and color mixing is expedited at the boundary between the image forming nuclides.

The temperature control circuit for maintaining the surface temperature of the color mixing roller 113a at 150°–160° C. is similar to the temperature control circuit for the transfer roller 4a shown in FIG. 12, and it is such that the surface temperature of the color mixing roller 113a is detected by a thermistor 113d provided on the surface of the color mixing roller 113a as shown in FIG. 19A and the heater 113c is ON and OFF.

(Another Embodiment)

In the aforedescribed embodiments, another embodiment of each portion will now be described.

(1) Transfer Recording Medium

The previous embodiments have been described with respect to two-color recording, but as the applicant made clear in Japanese Application Pat. No. 61-128814, by suitably choosing the kinds of the colorant and photopolymerization starting agent constituting the image forming nuclides and choosing a light source of a wavelength which causes the photo-polymerization starting agent to react, and using the process according to the application mentioned just above, it is also possible to obtain a recorded image of three or more colors or full color.

Further, in the previous embodiments, there has been shown an example in which an image is transferred to the recording sheet 8 by changing the softening point temperature of the transfer recording layer 1b of a high molecular material including a colorant by light energy and heat energy, but the image may be transferred and recorded by the difference in the bonding characteristic or the sublimation characteristic with respect to the recording sheet 8. Alternatively, the recording sheet 8 may be endowed with a color forming property, and a layer which will vary the color forming characteristic of the recording sheet 8 may be provided on the transfer recording medium 1, and an image formed on the transfer recording medium 1 may be transferred to the recording sheet 8 to thereby obtain an image.

The first energy and the second energy imparted to the transfer recording layer 1b are not limited to the aforementioned heat and light energy, but an image may be formed by the application of other energy such as pressure energy.

Also, as the material of the back-up member la, use may be made, for example, of polyamide, polyimide, condenser paper, celophane paper or the like, besides the aforementioned polyethylene terephthalate.

As the transfer recording layer 1b, use may be made of any transfer recording layer as long as its properties of matter can be varied by plural kinds of energy to form a transfer image. A transfer image can be formed if use is made, for example, of a transfer recording layer whose properties of matter such as the melting point, the softening point, the glass transition point and viscosity are changed by imparting plural kinds of energy thereto.

The image forming nuclides forming the transfer recording layer 1*b* contain a responsive component and a coloring component, and as the responsive component, use may preferably be made of a responsive component in which the response to a variation in the properties of matter starts when plural kinds of energy such as light and heat energy are imparted thereto or in which the speed of response to a variation in the properties of matter varies sharply.

The high molecular component contained in said responsive component may be a component which causes a polymerization reaction or a bridge response, such as monomer, oligomer or polymer.

As the monomer or oligomer, mention may be made, for example, of polyvinyl cinnamate, p-methoxy cinnamic acid-succinic acid semiester, or a material having a reaction group at the distal end or the lateral chain such as epoxy resin or unsaturated polyester resin.

As the polymeric monomer, mention may be made, for example, of ethylene glycol diacrylate, propylene glycol diacrylate or the like.

Where said polymeric monomer or oligomer is used, cellulose acetate succinate, methyl methacrylatehydroxyethyl methacrylate copolymer or the like may be contained therein to improve the layer forming property.

In order to cause the reaction of the high molecular component, a reaction starting agent is added as required. The reaction starting agent may preferably be a radical starting agent such as an azo-compound, an organic sulfur compound, a calginyl compound or a halogen compound.

Also, particularly for the construction of the transfer recording layer in a case where both of light and heat energy are received to form a transfer image, the kinds of the reaction starting agent and the high molecular component may be chosen so as to provide a combination in which the temperature dependency of the response speed is made great by the reaction of the reaction starting agent acting upon receipt of the aforementioned light energy and the high molecular component.

As such combination, mention may be made, for example, of a combination of a polymeric prepolymer having a functional group such as a copolymer of methacrylate ester or acrylate ester, a photosensitive bridge agent such as tetraethyleneglycol diacrylate, and a reaction starting agent such as benzophenone or michler's ketone.

The coloring component is a component contained to form an optically recognizable image, and may suitably be one of various pigments or dyes. As an example of such pigments or dyes, mention may be made of an inorganic pigment such as carbon black or lead yellow, an organic pigment such as Victoria blue lake or fast skyblue, or a colorant such as lenco dye or phthalocyanine dye.

A stabilizing agent such as hydroquinone or p-methoxyphenol may be contained in the transfer recording layer 1*b*.

Further, a sensitizer such as p-nitroaniline or 1,2-benzoanthraquinone for enhancing the activation of the reaction starting agent to energy may be contained in the transfer recording layer.

Furthermore, besides the colorant and responsive agent, resin, wax or liquid crystal as a binder may be mixed with the transfer recording layer 1*b*.

As the resin used as the binder, mention may be made, for example, polyester resin, polyamide resin or the like, and one or two or more of these may be mixed and used.

As the binder for wax, use can be made, for example, vegetable wax such as canderila wax or carnauba wax, animal wax such as whale wax, mineral wax such montan wax, or synthetic wax composed of fatty acid or fatty acid amide, ester, etc., and one or two or more of these waxes may be mixed and used.

Also, as the liquid crystal used as the binder, mention may be made of cholesterol hexanoate, cholesterol decanoate or the like.

Where microcapsules are used for the image forming nuclides which constitute the transfer recording layer 1*b*, the aforementioned materials are contained in the core portion, and as the material used as the wall material of the microcapsules, mention may be made of gelatin, Arabian rubber, a cellulose material such as nitrocellulose or ethylcellulose, or a polymer material such as polyethylene or polystyrene.

(2) Recording Unit

The aforedescribed embodiments are of a construction wherein in the recording unit 3, a light of a predetermined wavelength corresponding to a desired color is uniformly applied to the transfer recording layer 1*b* side of the transfer recording medium 1 and heat corresponding to the image signal is applied to the back-up member la side, but as another embodiment, design may be made such that heat is uniformly applied and at the same time, a predetermined light is applied in conformity with the image signal.

Also, if the back-up member 1*a* is formed of a light-transmitting material, design may be made such that light is applied to the back-up member 1*a* side and heat is applied to the transfer recording layer 1*b* side.

Further, in the aforedescribed embodiments, application of light and application of heat have been effected to the opposite sides of the back-up member 1*a*, but image formation will also be possible even if both of application of light and application of heat are effected to one side of the back-up member 1*a*.

As the heating means, besides the aforedescribed method using the recording head 3*a*, use may be made of a method using a YAG laser and a polygon mirror to selectively heat.

As the light applying means, besides the aforedescribed method using the fluorescent lamps 3*c* and 3*d*, use can be made, for example, of a method using an LED array, or a method using a xenon lamp and a filter matching the light absorbing characteristic of the material.

In the aforedescribed embodiments, light energy and heat energy are imparted to the transfer recording layer 1*b* at a time, but light energy and heat energy may be imparted discretely with a result that both of light energy and heat energy are imparted after all.

(3) Transfer Unit

The transfer unit 4 is not limited to a rollerlike one comprising the transfer roller 4*a* and the pressing roller 4*b*, but may be of any construction which can provide desired pressure, such as a rotatable belt.

Also, as required, fixating means for fixating the image on the recording medium transferred in the transfer unit 4 may be provided downstream of the peeling-off roller 5 with respect to the direction of conveyance of the recording medium.

(4) Recording Medium

The recording medium is not limited to the aforedescribed recording sheets, but for example, plastic sheets for overhead projector (OHP) can also be used as a matter of course.

(5) Applying Means

In the aforedescribed first embodiment, there has been shown an example in which the color mixing roller 14*a* is rotated about 2 % faster than the conveying belt 14*b*, but the speed difference between the color mixing roller 14*a* and the conveying belt 14*b* can be suitably set by the relation thereof with the pressure forces of the two. Accordingly, the direction of rotation of the color mixing roller 14*a* may be set to the direction opposite to that in the aforedescribed first embodiment, or may be fixed.

Also, a cleaning mechanism for the color mixing roller 14*a* may be provided as shown in FIG. 16A or 16B.

The construction of FIG. 16A is such that a felt bar 14*e* comprising aromatic polyamide resin fiber made into the form of felt and impregnated with 5,000–10,000 cs of silicon oil is urged against the color mixing roller 14*a*. If this is done, the surface of the color mixing roller 14*a* which has contacted with the image on the recording sheet 8 can be cleaned by the felt bar 14*e* and the offset of the image forming nuclides can be prevented. The construction of FIG. 16B is such that a cleaning belt 14*f* comprising aromatic polyamide resin fiber made into the form of a web and likewise impregnated with silicon oil is urged against the color mixing roller 14*a* by an urging roller 14*g*, and this construction can obtain an effect similar to that of the construction of FIG. 16A.

Also, a construction as shown in FIG. 17 wherein instead of a rotatable member such as the color mixing roller 14*a*, a color mixing bar 16 of an edge shape containing a heater 16*a* therein is urged against the conveying belt 14*b* can apply heat and a shearing force to the image forming nuclides on the recording sheet 8.

Further, as shown in FIGS. 18A and 18B, a piezo-electric vibrator 16*b* may be attached to the color mixing bar 16 and it may be finely vibrated at a frequency of the order of 20–50 KHz in the direction of arrow f. If the color mixing bar 16 is thus finely vibrated, the aforedescribed color mixing effect can be more improved.

(6) Heat and Pressure Applying Means

In the aforedescribed second embodiment, the color mixing roller 113*a* constituting the heat and pressure applying means 113 is constructed of an aluminum roller having its surface directly coated with Teflon resin, but as shown in FIG. 25, it may be constructed of an aluminum roller 113*a* covered with silicone rubber 113*a*$_2$ of hardness of 40 degrees to a thickness of 0.5 mm, the surface of which is coated with a Teflon resin layer 113*a*$_3$.

If the surface of the color mixing roller 113*a* adapted to be urged against the recording surface of the r-ecording sheet 8 is covered with an elastic material as previously described, the color mixing roller 113*a* will be positively urged against said recording surface as shown in FIG. 25 even if the image is uneven. Accordingly, the application of heat and pressure and imparting of vibration will be accomplished reliably and thus, better images can be obtained.

In the previously described embodiment, the surface of the color mixing roller 113*a* is coated with a Teflon resin layer, thereby preventing the offset of the image transferred to the recording sheet 8, but as shown in FIGS. 26A and 26B, the image transferred to the color mixing roller 113 may be removed by a cleaning mechanism.

The construction of FIG. 26A is such that a felt bar 113*e* comprising aromatic polyamide resin fiber made into the form of felt and impregnated with 5,000–10,000 cs of silicon oil is urged against the color mixing roller 113*a*. If this is done, the surface of the color mixing roller 113*a* which has contacted with the image on the recording sheet 8 will be cleaned by the felt bar 113*e* and the offset of the image forming nuclides will be prevented.

Also, the construction of FIG. 26B is such that a cleaning belt 113*f* comprising aromatic polyamide resin fiber made into the form of a web and likewise impregnated with silicon oil is urged against the color mixing roller 113*a* by an urging roller 113*g*, and this construction can obtain an effect similar to that of the construction of FIG. 26A.

Further, the vibration unit 115 may comprise a bolted Langevin type piezo-electric vibrator 115*c* mounted as shown in FIG. 27, instead of the aforementioned voice coil type vibration unit, and electric power may be supplied to the vibrator 115*c* by a slip ring 115*d*. In this case, the vibration frequency may be a tine frequency of the order of 15–50 kHz.

In the aforedescribed embodiments, the vibration frequency is 200 Hz and the amplitude is 0.3 mm, but of course, the vibration frequency and amplitude of the color mixing roller 113*a* are not limited to the aforementioned values.

As described above, according to the present invention, the formation of an image on the transfer recording medium and the transfer of the image to the recording medium are effected in succession, and image recording can be accomplished well even on a recording medium of a relatively low degree of surface smoothness. Also, where the present invention is applied to polychromatic recording, a polychromatic image can be obtained without causing the recording medium to effect complicated movement.

Also, by applying predetermined pressure and/or heat to the recording medium having an image transferred thereto, the coverage of the image can be improved, and mixing of colors can be promoted to thereby obtain an image of high quality.

We claim:

1. An image recording apparatus having:

conveying means for conveying a transfer recording medium having a transfer recording layer whose transfer characteristic is varied upon application of first energy and second energy differing from said first energy;

a recording section having first energy imparting means for imparting said first energy to said transfer recording medium and second energy imparting means for imparting said second energy to said transfer recording medium provided along the conveyance route of said transfer recording medium conveyed by said conveying means;

a transfer section for transferring an image formed on said transfer recording medium in said recording section to a recording medium; and applying means for applying predetermined heat energy and a shearing force to said recording medium to which the image has been transferred in said transfer section.

2. An image recording apparatus having:

conveying means for conveying a transfer recording medium having a transfer recording layer whose transfer characteristic is varied upon application of first energy and second energy differing from said first energy;

a recording section having first energy imparting means for imparting said first energy to said transfer recording medium and second energy imparting means for imparting said second energy to said transfer recording medium provided along the conveyance route of said transfer recording medium conveyed by said conveying means;

a transfer section for transferring an image formed on said transfer recording medium in said recording section to a recording medium; and applying means for applying pressure with a shearing force to said recording medium to which the image has been transferred in said transfer section.

3. An image recording apparatus for recording an image on a recording medium, having:

conveying means for conveying a transfer recording medium having a transfer recording layer whose transfer characteristic is varied by one or more kinds of energy being imparted thereto;

a first image forming section provided along the conveyance route of said transfer recording medium conveyed by said conveying means for imparting said energy to said transfer recording medium to form an image on said transfer recording medium;

a second image forming section for forming on said recording medium a visible image corresponding to the image formed on said transfer recording medium in said first image forming section; and shearing force applying means for applying a shearing force to said recording medium which has passed through said second image forming section.

4. An image recording method for recording an image on a recording medium, having:

the energy imparting step of imparting energy to a transfer recording medium having a transfer recording layer whose transfer characteristic is varied upon application of said energy to form an image on said transfer recording medium;

the transferring step of transferring the image formed on said transfer recording medium by said energy imparting step to said recording medium; and the step of imparting a shearing force to said recording medium to which the image has been transferred by said transferring step.

5. An image recording apparatus having:

conveying means for conveying a transfer recording medium having a transfer recording layer whose transfer characteristic is varied upon application of first energy and second energy differing from said first energy;

a recording section having first energy imparting means for imparting said first energy to said transfer recording medium and second energy imparting means for imparting said second energy to said transfer recording medium provided along the conveyance route of said transfer recording medium conveyed by said conveying means;

a transfer section for transferring an image formed on said transfer recording medium in said recording section to a recording medium;

heat and pressure applying means for imparting heat and pressure to the recording medium which has passed through said transfer section; and vibrating means for finely vibrating said heat and pressure applying means.

6. An image recording apparatus according to claim 1, wherein said first energy is heat and said second energy is light.

7. An image recording apparatus according to claim 1, wherein said shearing force is applied in a direction substantially perpendicular to the direction of conveyance of said recording medium.

8. An image recording apparatus according to claim 1, wherein said shearing force is applied in a direction substantially equal to the direction of conveyance of said recording medium.

9. An image recording apparatus according to claim 2, wherein said first energy is heat and said second energy is light.

10. An image recording apparatus according to claim 5, wherein said first energy is heat and said second energy is light.

11. An image recording apparatus according to claim 3, wherein said energy is heat.

12. An image recording method according to claim 4, wherein said energy is heat.

13. An image recording apparatus according to claim 3, wherein said energy is light.

14. An image recording method according to claim 4, wherein said energy is light.

15. An image recording apparatus according to claim 5, wherein said heat and pressure applying means has an elastic member on that portion thereof which contacts with the recording surface of said recording medium.

16. An image recording apparatus according to claim 5, wherein a layer to which the image transferred to said recording medium is not transferred is formed on that surface of said heat and pressure applying means which contacts with said recording medium.

17. An image recording apparatus according to claim 2, wherein said shearing force is applied in a direction substantially perpendicular to the direction of conveyance of said recording medium.

18. An image recording apparatus according to claim 2, wherein said shearing force is applied in a direction substantially equal to the direction of conveyance of said recording medium.

19. An image recording apparatus according to claim 3, wherein said shearing force is applied in a direction substantially perpendicular to the direction of conveyance of said recording medium.

20. An image recording apparatus according to claim 3, wherein said shearing force is applied in a direction substantially equal to the direction of conveyance of said recording medium.

21. An image recording method according to claim 4, wherein said shearing force is applied in a direction substantially perpendicular to the direction of conveyance of said recording medium.

22. An image recording method according to claim 4, wherein said shearing force is applied in a direction substantially equal to the direction of conveyance of said recording medium.

23. An image recording apparatus according to claim 2, wherein said applying means applies heat energy in addition to the pressure resulting in a shearing force.

* * * * *

UNITED STATES PATENT AND TRADEMARK OFFICE
CERTIFICATE OF CORRECTION

PATENT NO. : 4,894,666 Page 1 of 2

DATED : January 16, 1990

INVENTOR(S) : ISHIKAWA, ET AL.

It is certified that error appears in the above-identified patent and that said Letters Patent is hereby corrected as shown below:

AT [57] ABSTRACT:

Line 27,
"shearing to" should read --shearing force to--.

COLUMN 1:

Line 9, "¢ image recording apparatus" should read --"image recording apparatus"--.
Line 23, "binder" should read --binder.--.

COLUMN 3:

Line 10, "various signals." should read --supply of various signals.--.

COLUMN 4:

Line 51, "microcapsulelike" should read --microcapsule-like--.

COLUMN 10:

Line 3, "fluorescent lamps 3c and 3d which are 20 W type" should be deleted.
Line 4, "light" should be deleted.

COLUMN 11:

Line 14, "times $T_1 14$ $T_5$" should read --times $T_1$-$T_5$--.

UNITED STATES PATENT AND TRADEMARK OFFICE

CERTIFICATE OF CORRECTION

PATENT NO. : 4,894,666 Page 2 of 2

DATED : January 16, 1990

INVENTOR(S) : ISHIKAWA, ET AL.

It is certified that error appears in the above-identified patent and that said Letters Patent is hereby corrected as shown below:

COLUMN 12:

Line 51, "(S5), for" should read --(S5), whereafter the same signal becoming "high" is waited for--.

COLUMN 14:

Line 22, "color mixing roller 4a" should read --color mixing roller 14a"

COLUMN 19:

Line 66, "r-ecord-" should read --record---.

COLUMN 20:

Line 34, "tine" should read --fine--

Signed and Sealed this

Third Day of November, 1992

*Attest:*

DOUGLAS B. COMER

*Attesting Officer*

*Acting Commissioner of Patents and Trademarks*